(12) United States Patent
Chen

(10) Patent No.: US 12,426,707 B2
(45) Date of Patent: Sep. 30, 2025

(54) ASSEMBLED DRAWER

(71) Applicant: E & Home Co., Ltd., Fujian (CN)

(72) Inventor: Xusheng Chen, Fujian (CN)

(73) Assignee: E & Home Co., Ltd., Fujian (CN)

( * ) Notice: Subject to any disclaimer, the term of this patent is extended or adjusted under 35 U.S.C. 154(b) by 119 days.

(21) Appl. No.: 18/516,980

(22) Filed: Nov. 22, 2023

(65) Prior Publication Data

US 2024/0081529 A1 Mar. 14, 2024

(51) Int. Cl.
*A47B 88/90* (2017.01)
*A47B 88/41* (2017.01)
*A47B 88/95* (2017.01)

(52) U.S. Cl.
CPC ............ *A47B 88/941* (2017.01); *A47B 88/41* (2017.01); *A47B 2088/954* (2017.01)

(58) Field of Classification Search
CPC . A47B 88/941; A47B 88/41; A47B 2088/954; A47B 2210/098; F16B 12/20
USPC ............ 312/348.1, 348.2, 348.4, 257.1, 263, 312/265.5
See application file for complete search history.

(56) References Cited

U.S. PATENT DOCUMENTS

| | | | | |
|---|---|---|---|---|
| 4,120,551 A * | 10/1978 | Godtschalck | ........ | A47B 88/941 220/691 |
| 4,332,052 A * | 6/1982 | Remington | ......... | B60B 33/0002 248/225.11 |
| 4,422,212 A * | 12/1983 | Sheiman | ................ | A45C 5/143 280/37 |
| 4,597,122 A * | 7/1986 | Handler | ................. | A47B 88/41 5/503.1 |
| 4,817,237 A * | 4/1989 | Murphy | .............. | B60B 33/0002 16/257 |
| 4,874,209 A * | 10/1989 | Spitzer | ................... | A47B 88/70 16/29 |
| 5,823,650 A * | 10/1998 | Lin | ...................... | A47B 88/941 312/265.5 |
| 6,588,059 B1 * | 7/2003 | McCord | ............. | B60B 33/0049 16/31 R |
| 9,549,485 B2 * | 1/2017 | Eguchi | ............... | G03G 21/1619 |
| 9,629,462 B2 * | 4/2017 | Fu | .......................... | A47B 88/95 |
| 9,707,802 B1 * | 7/2017 | Abbassi | ............. | B60B 33/0013 |
| 10,316,584 B1 * | 6/2019 | Cooper | ................... | E06C 1/005 |
| 11,122,896 B1 * | 9/2021 | Chen | ..................... | F16B 5/0614 |

(Continued)

FOREIGN PATENT DOCUMENTS

| CN | 207179885 U | * | 4/2018 |
|---|---|---|---|
| JP | S6128440 U | * | 2/1986 |
| JP | H0612669 Y2 | * | 4/1987 |

*Primary Examiner* — Kimberly T Wood
(74) *Attorney, Agent, or Firm* — Birchwood IP

(57) ABSTRACT

An assembled drawer having a bottom plate, a rear plate, and two side plates; the rear plate and the two side plates are detachably installed on the bottom plate; the rear plate is connected to a rear side of the bottom plate, and the two side plates are connected to a left side and a right side of the bottom plate respectively, and the rear plate and the two side plates are connected to the bottom plate by engagement of fastening blocks into fastening grooves; the two side plates are fixed to a left side edge and a right side edge of the rear plate respectively through fasteners, and the rear plate and the two side plates are erected on the bottom plate to define a storage space on the bottom plate. The drawer has a simple structure and easy to assemble and disassemble.

9 Claims, 23 Drawing Sheets

(56) References Cited

U.S. PATENT DOCUMENTS

| | | | | |
|---|---|---|---|---|
| 2003/0094554 A1* | 5/2003 | Bushey | .................. | B60B 33/001 |
| | | | | 248/346.11 |
| 2005/0140256 A1* | 6/2005 | Wang | ................... | A47B 88/941 |
| | | | | 312/265.5 |
| 2011/0221318 A1* | 9/2011 | Chen | .................... | A47B 88/941 |
| | | | | 312/263 |

* cited by examiner

ASSEMBLED DRAWER

BACKGROUND OF THE INVENTION

The present invention relates to the technical field of furniture, and in particular to an assembled drawer.

At present, more and more furniture for increasing the storage space are available in the market, and a drawer that can be fitted at the bottom of a bed or a sofa is also becoming a popular choice. In the prior art, a drawer is usually an assembly of different plates, and usually includes a front side plate, a rear side plate, a bottom plate, a left side plate and a right side plate etc., and the plates are fixed and assembled solely by bolts, hence resulting in complicated and tedious assembly.

For this purpose, a novel assembled drawer is disclosed in CN218650977U, which uses first connectors and second connectors used to connect the plates, so as to assemble the plates. Compared with an assembly that solely depends on the bolts, the assembly disclosed by the CN prior art is simpler. However, the assembly of the drawer can only be realized by using a plurality of first connectors and second connectors, so assembly and disassembly are still troublesome, and the structural stability of the drawer is poor due to a clamping or snap fitting connection. In addition, the use of a plurality of first connectors and second connectors means increased number of accessories, and the accessories may easily get lost during assembly and disassembly procedures.

In view of the above, the inventors have made extensive studies on various defects caused by the imperfect designs of the existing assembled drawer, and have actively researched and developed the present invention by improvement and trial.

BRIEF SUMMARY OF THE INVENTION

The present invention aims to provide an assembled drawer, which is simple in structure and convenient to disassemble and assemble.

To attain the above objects, the present invention provides the following technical solutions:

An assembled drawer, comprising a bottom plate, a rear plate, and two side plates; the rear plate and the two side plates are detachably installed on the bottom plate;

the rear plate is connected to a rear side of the bottom plate, and the two side plates are connected to a left side and a right side of the bottom plate respectively, and the rear plate and the two side plates are connected to the bottom plate by engagement of fastening blocks into fastening grooves; the two side plates are fixed to a left side edge and a right side edge of the rear plate respectively through fasteners, and the rear plate and the two side plates are erected on the bottom plate to define a storage space on the bottom plate.

The fastening grooves are formed on a left side, a right side, and a rear side of an upper surface of the bottom plate, and the fastening grooves penetrate the upper surface of the bottom plate through a bottom surface of the bottom plate; bottom edges of the rear plate and the two side plates are provided with the fastening blocks engageable with the fastening grooves.

Each of the fastening blocks is provided with a connection part and a clamping part; one end of the connection part is connected to a corresponding one of the rear plate and the two side plates, and another end of the connection part is connected to the clamping part, and the clamping part is parallel to the bottom edge of the corresponding one of the rear plate and the two side plates; a clamping slit is formed between the clamping part and the corresponding one of the rear plate and the two side plates, and the bottom plate is clamped by the clamping slit.

The bottom surface of the bottom plate is provided with retaining walls, and the retaining walls enclose the bottom surface of the bottom plate and divide the bottom surface of the bottom plate into at least three storage areas; the rear plate and the two side plates are accommodated in the three storage areas respectively when the assembled drawer is in a disassembled state.

Two of the three storage areas for storing the two side plates are defined as a first storage area and a second storage area respectively; first fool-proof blocks corresponding to the fastening blocks of one of the two side plates respectively are arranged in the first storage area, and second fool-proof blocks corresponding to the fastening blocks of another one of the two side plates respectively are arranged in the second storage area; oppositely facing side edges of the first storage area and the second storage area closest to each other are defined as first side edges of the first storage area and the second storage area, and oppositely facing side edges of the first storage area and the second storage area farthest away from each other are defined as second side edges of the first storage area and the second storage area; the first fool-proof blocks are disposed at the second side edge of the first storage area, while the second fool-proof blocks are disposed at the second side edge of the second storage area.

The assembled drawer also comprises at least two casters; the casters are detachably mounted on the bottom surface of the bottom plate; each caster comprises a support frame and a wheel; the bottom surface of the bottom plate is also provided with mounting grooves corresponding to the casters respectively; an upper end of each support frame is inserted into a corresponding mounting groove, and the mounting groove limits the support frame from moving horizontally; at least one first limiting member is arranged on each support frame; at least one second limiting member corresponding to said at least one first limiting member is arranged on at least one groove wall of the corresponding mounting groove, and said at least one first limiting member and said at least one second limiting member are fastened to each other to limit the support frame from being separated from the corresponding mounting groove; the wheel is rotatably connected to a lower part of the support frame.

Each first limiting member of each support frame is arranged on an elastic sheet; the elastic sheet is formed on the corresponding support frame; a lower end of the elastic sheet extends out of the corresponding mounting groove; when the elastic sheet is pressed, the first limiting member on the elastic sheet is separated from a corresponding second limiting member.

Said at least one first limiting member comprises two first limiting members, and the two first limiting members are located on two opposite side surfaces of each support frame respectively.

Said at least one first limiting member and said at least one second limiting member are both ribs; guide slopes are provided on the ribs respectively.

A width of the each mounting groove is greater than a width of a corresponding support frame, and each of said at least one second limiting member is arranged on a corresponding groove wall which corresponds to a lengthwise direction of the mounting groove; at least two positioning ribs are further arranged on the corresponding groove wall, and said at least two positioning ribs are positioned on two sides of a corresponding second limiting member respectively; said at least two positioning ribs are flush with the corresponding second limiting member.

A length of each mounting groove is the same as a length of the support frame, two groove walls along a widthwise direction of the mounting groove are each provided with a positioning strip to position the corresponding support frame, and the support frame is provided with positioning insertion grooves each corresponding to a corresponding positioning strip.

According to the technical solutions provided above, the two side plates, the rear plate, and the bottom plate are assembled through engagement of fastening blocks into the fastening grooves in combination with the use of fasteners. Engagement of the fastening blocks into the fastening grooves on one hand reduces the number of fasteners being used, and on the other hand achieves preliminary fixation between the two side plates, the rear plate, and the bottom plate. This preliminary fixation will also align the two side plates with the rear plate so that users can conveniently fix the two sides plates with the rear plate by using the fasteners. In addition, by provided mounting grooves on the bottom surface of the bottom plate, the casters are inserted into the mounting grooves respectively, thereby achieving quick assembly of the casters to the bottom plate. The assembled drawer of the present invention is simple in structure, the two side plates, the rear plate, and the bottom plate can be fixed simply by using two fasteners. The user can conveniently assemble and disassemble the drawer, and problems like accessories getting lost will not easily happen.

Figure 1:
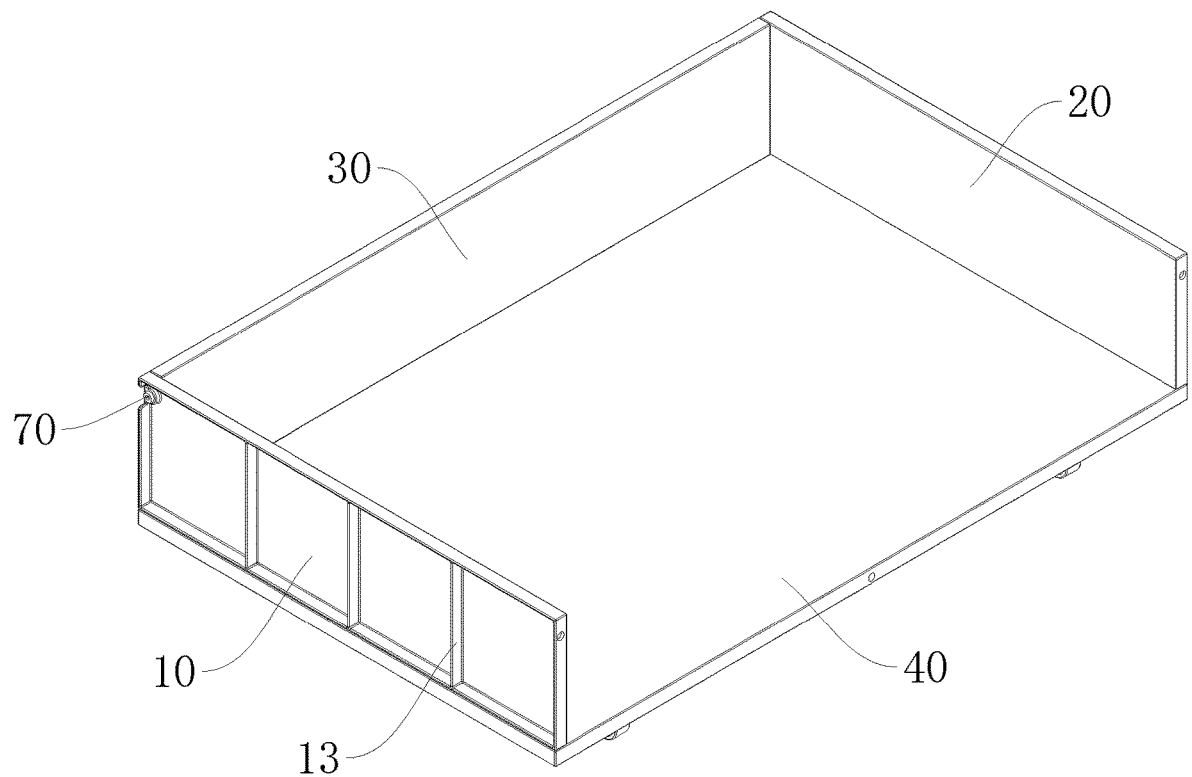
FIG. 1 is a first perspective view of the assembled drawer of the present invention when assembled.
Figure 2:
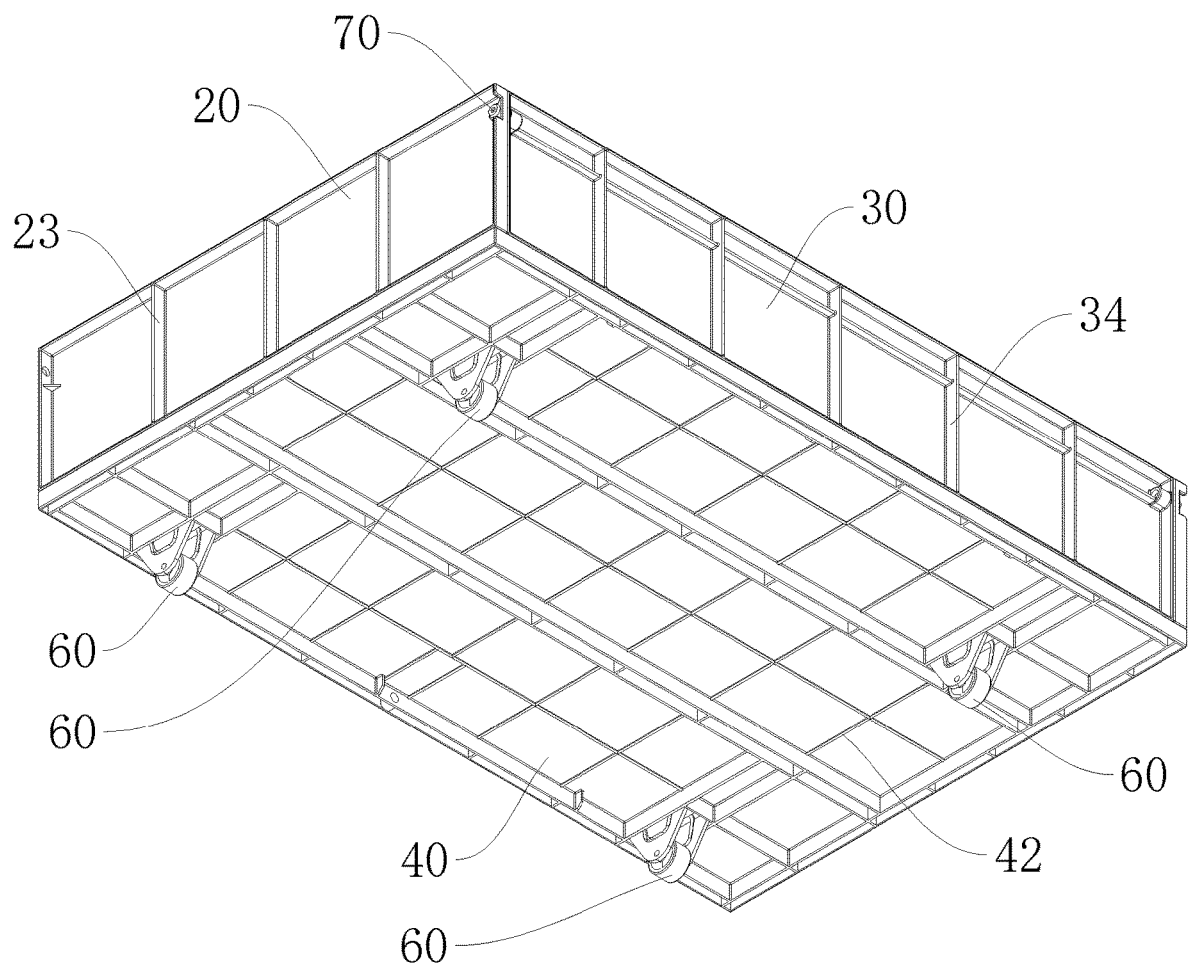
FIG. 2 is a second perspective view of the assembled drawer of the present invention when assembled.
Figure 3:
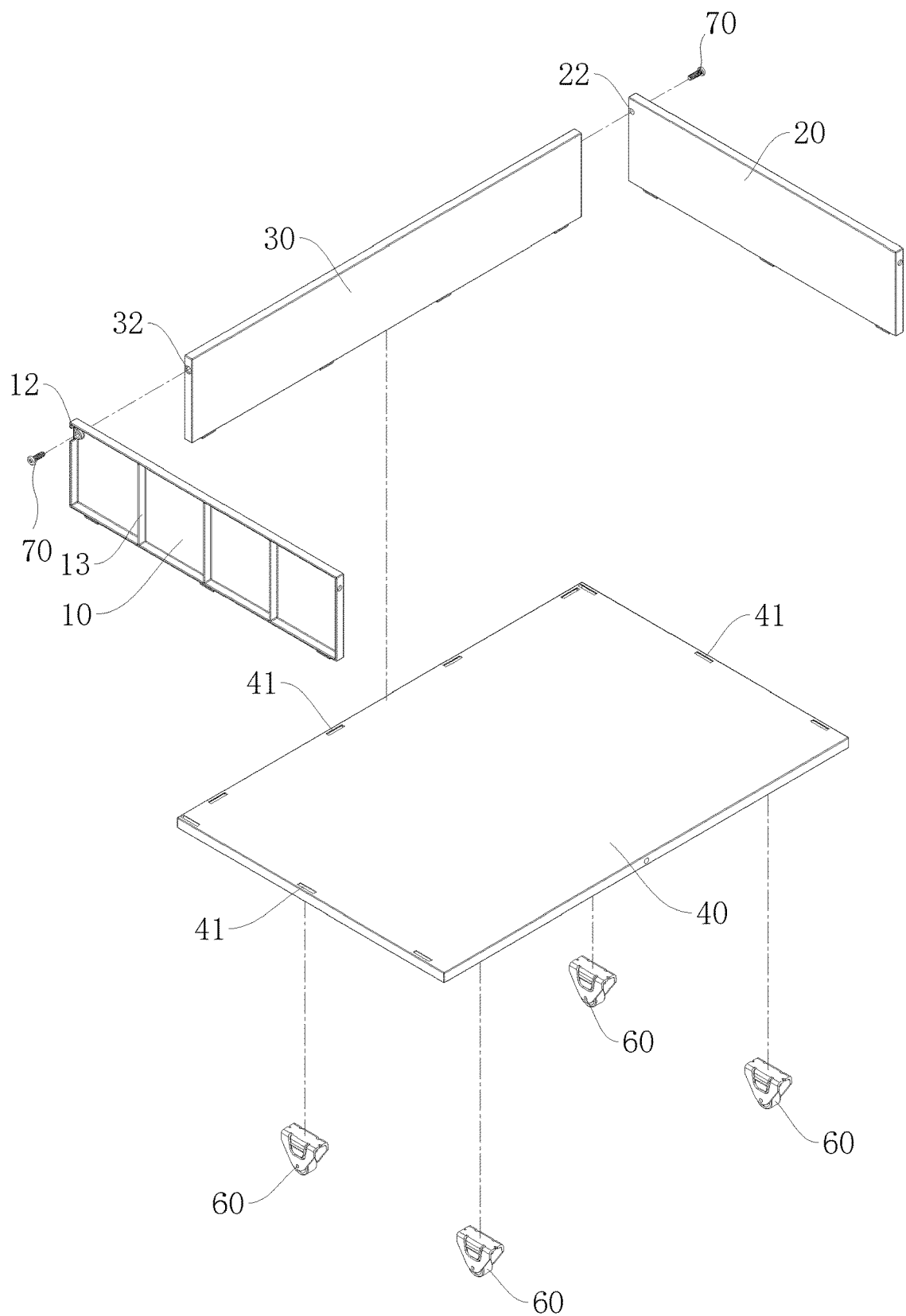
FIG. 3 is a first exploded view of the assembled drawer of the present invention.
Figure 4:
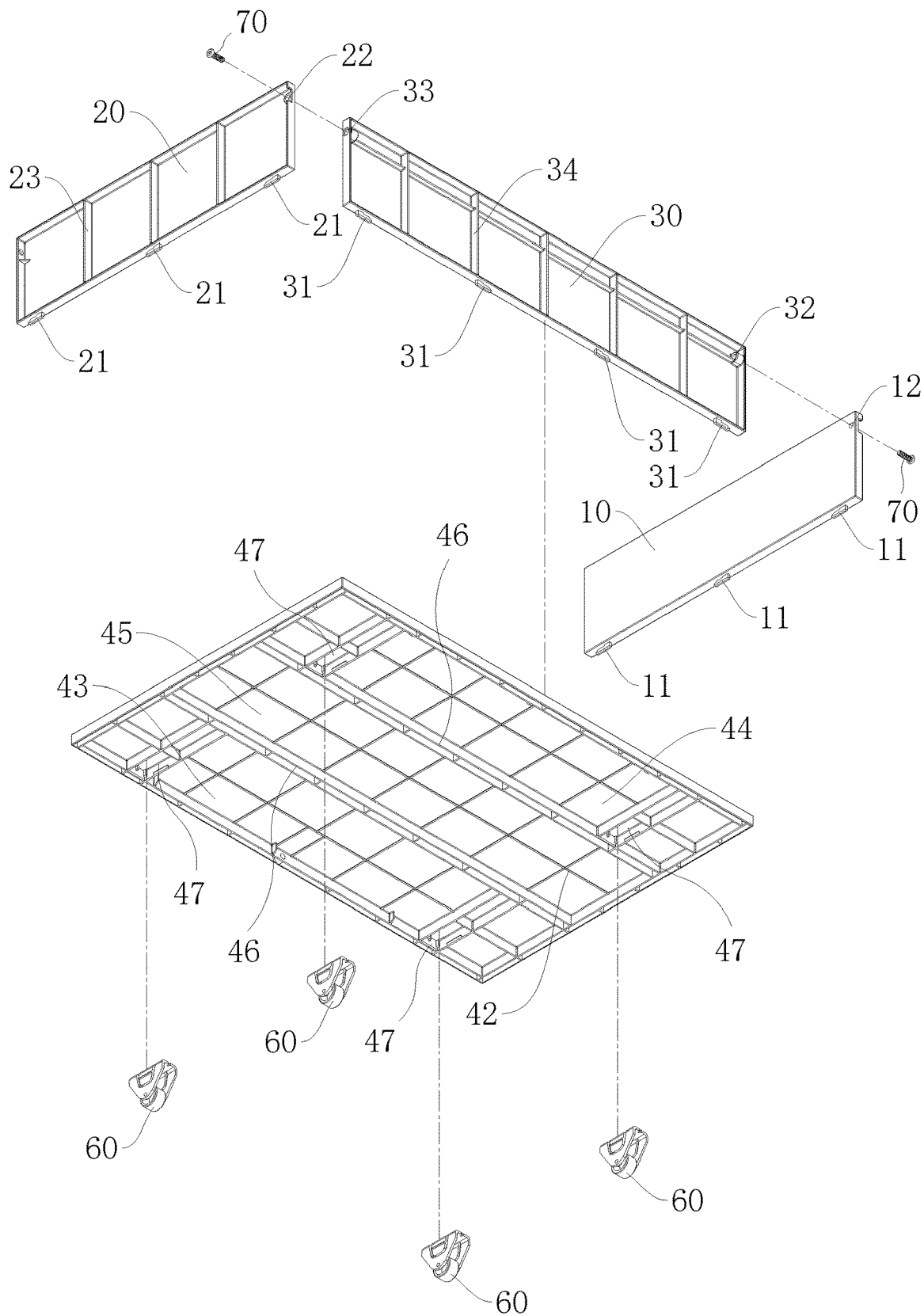
FIG. 4 is a second exploded view of the assembled drawer of the present invention.

DESCRIPTION OF REFERENCE NUMERALS first side plate 10, first fastening block 11, connection part 111, clamping part 112, clamping slit 113, inclined guide surface 114, guide part 115, first fixing hole 12, first reinforcing rib 13;

second side plate 20, second fastening block 21, second fixing hole 22, second reinforcing rib 23;

rear plate 30, third fastening block 31, third fixing hole 32, fourth fixing hole 33, third reinforcing rib 34;

bottom plate 40, fastening groove 41, fourth reinforcing rib 42, first storage area 43, first fool-proof block 431, second storage area 44, second fool-proof block 441, third storage area 45, retaining wall 46, mounting groove 47, second limiting member 471, second guide slope 472, positioning rib 473, first inclined slope 474, positioning strip 475, second inclined slope 476;

drawer front panel 50;

caster 60, support frame 61, first limiting member 611, first guide slope 612, connection plate 613, side plate 614, elastic sheet 615, positioning insertion groove 616, wheel 62, pivot shaft 63; and fastener 70.

DETAILED DESCRIPTION OF THE INVENTION

As shown in FIGS. 1-4, the present invention discloses an assembled drawer, comprising a bottom plate 40, a rear plate 30, two side plates, and four casters 60. The rear plate 30 and the two side plates are detachably installed on the bottom plate 40; the rear plate 30 is connected to a rear side of the bottom plate 40, and the two side plates are connected to a left side and a right side of the bottom plate 40 respectively, and the rear plate 30 and the two side plates are connected to the bottom plate 40 by engagement of fastening blocks into fastening grooves 41; the two side plates are fixed to a left side edge and a right side edge of the rear plate 30 respectively through fasteners 70 (the fasteners 70 may be bolts, screws and the like), and the rear plate 30 and the two side plates are erected on the bottom plate 40 define a storage space on the bottom plate 40.

The two side plates comprises a first side plate 10 and a second side plate 20, wherein the first side plate 10 is connected to the left side of the bottom plate 40 and is also fixed to the left side edge of the rear plate 30 through at least one of said fasteners 70; in this embodiment, the first side plate 10 and the rear plate 30 can be fixed through one fastener 70. The second side plate 20 is connected to the right side of the bottom plate 40 and is also fixed to the right side edge of the rear plate 30 through at least one of said fasteners 70; in this embodiment, the second side plate 20 and the rear plate 30 can be fixed through one fastener 70.

Figure 5:
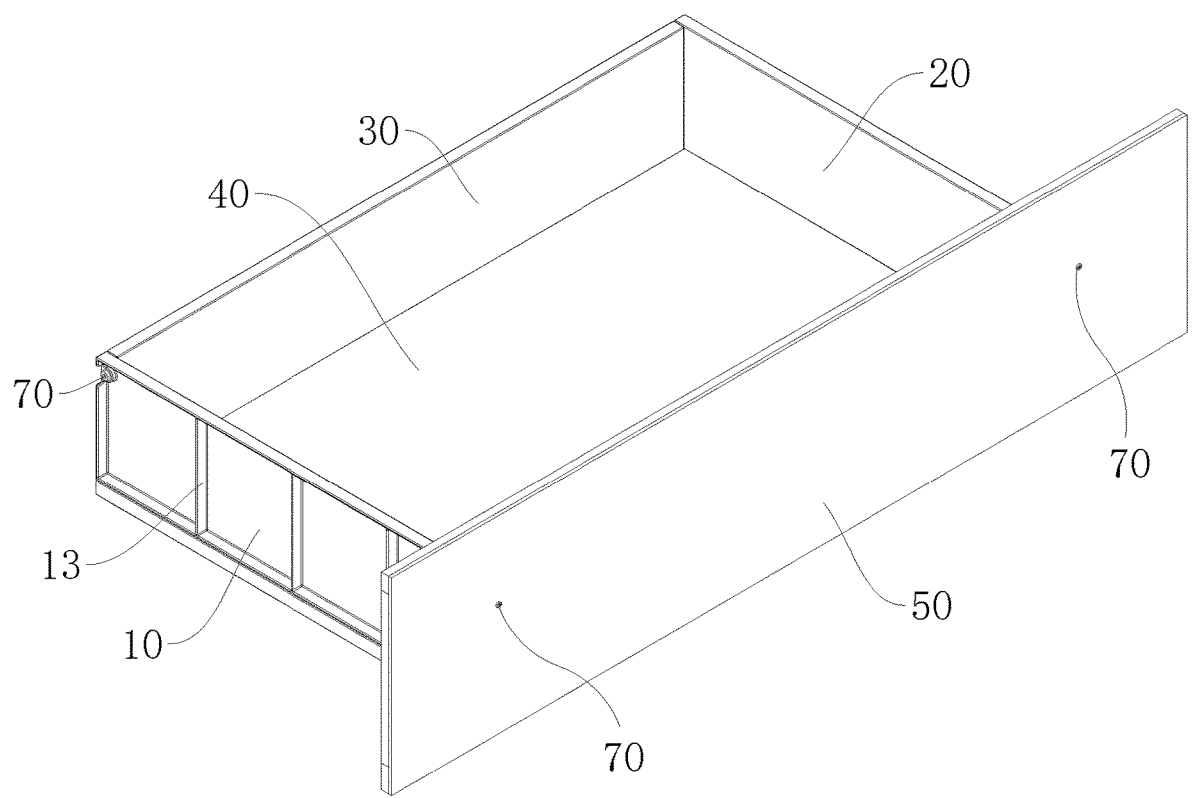
FIG. 5 is a diagram of a state of use of the assembled drawer of the present invention.
Figure 6:
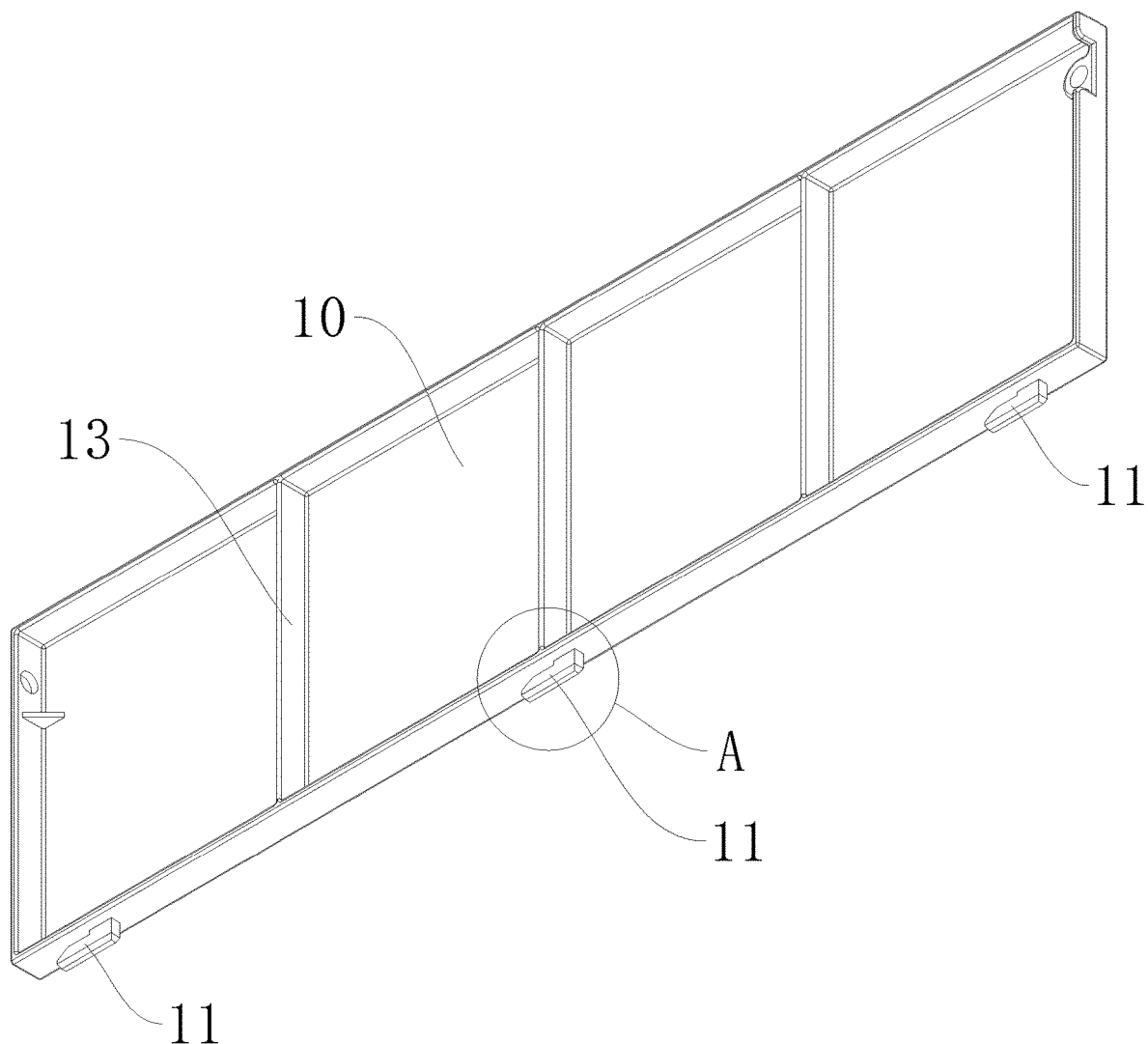
FIG. 6 is a perspective view of a first side plate.
Figure 7:
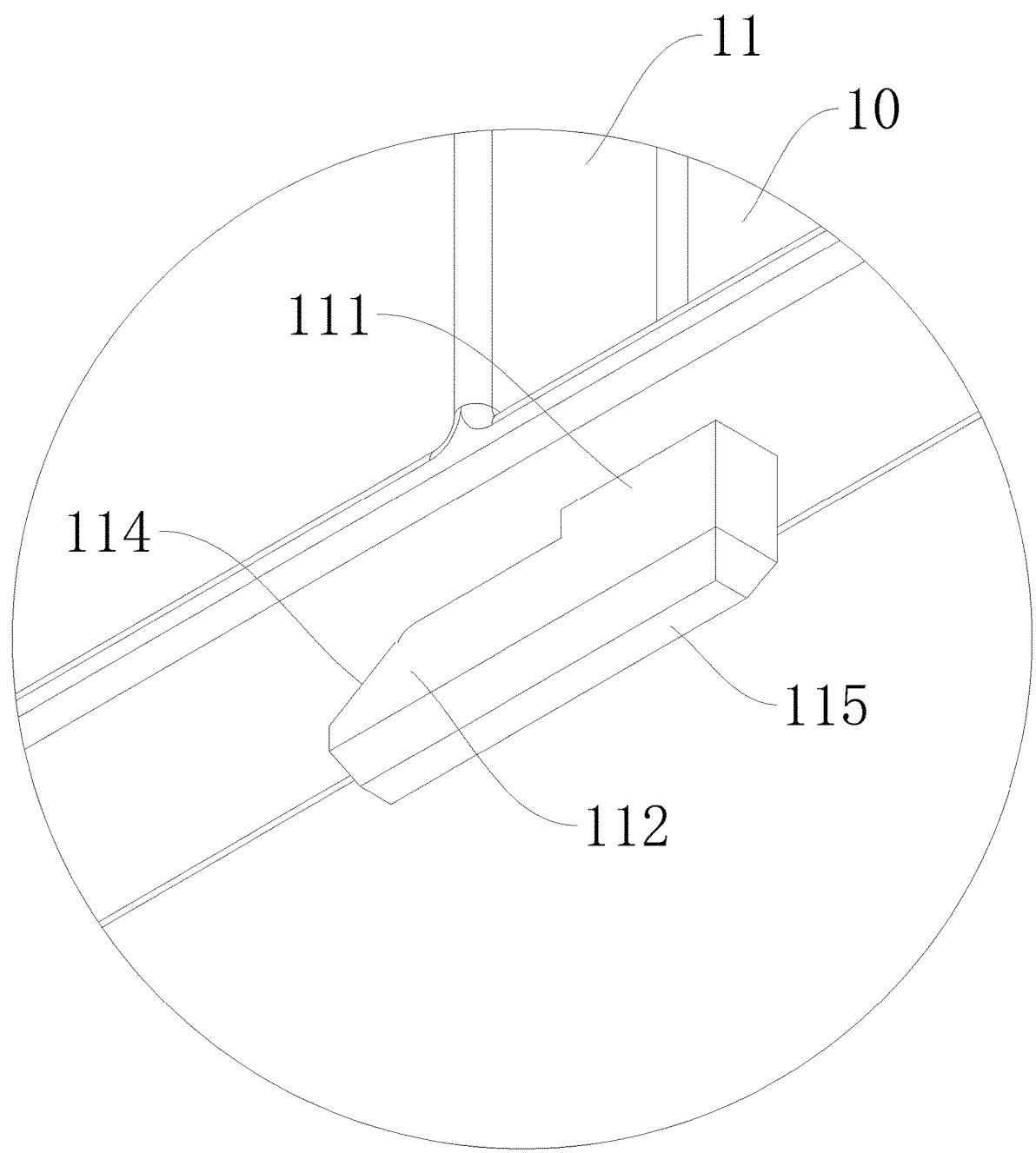
FIG. 7 is an enlarged view of portion A in FIG. 6.
Figure 8:
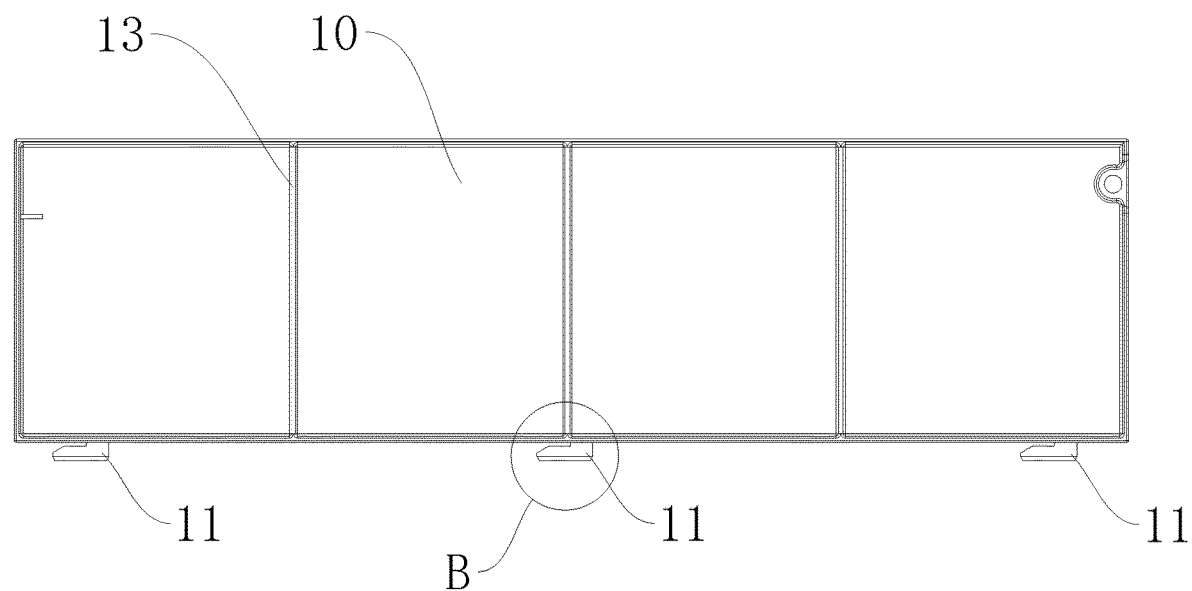
FIG. 8 is a front view of a first side plate.
Figure 9:
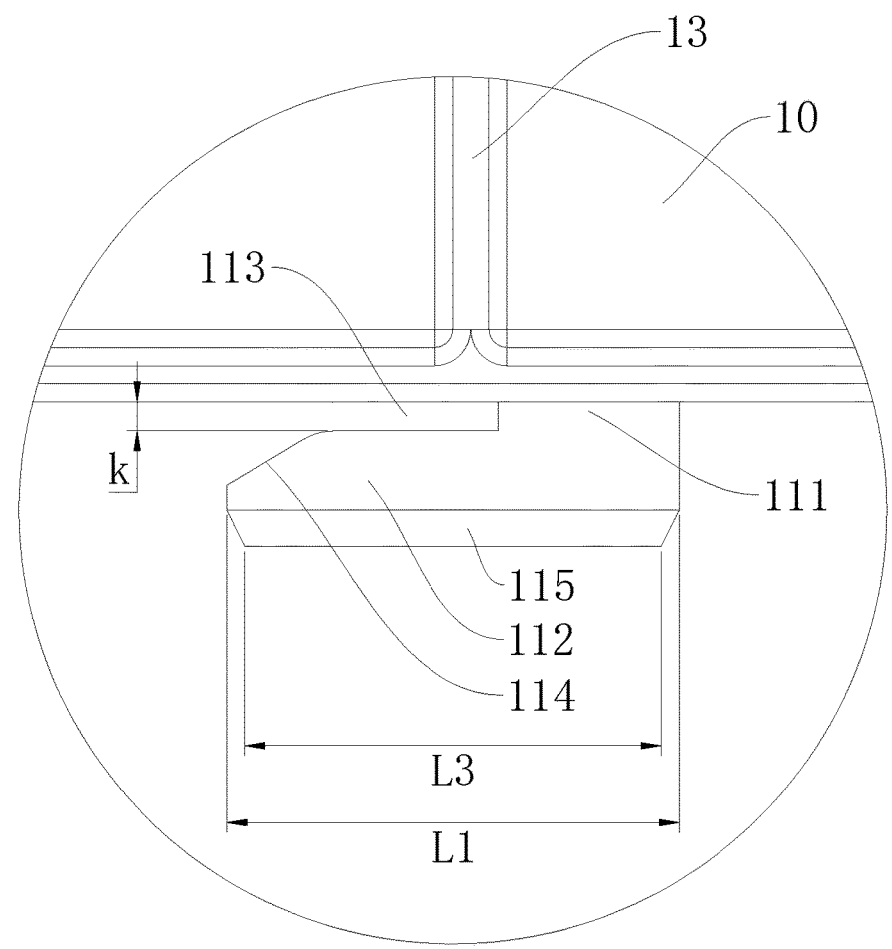
FIG. 9 is an enlarged view of portion B in FIG. 8.
Figure 10:
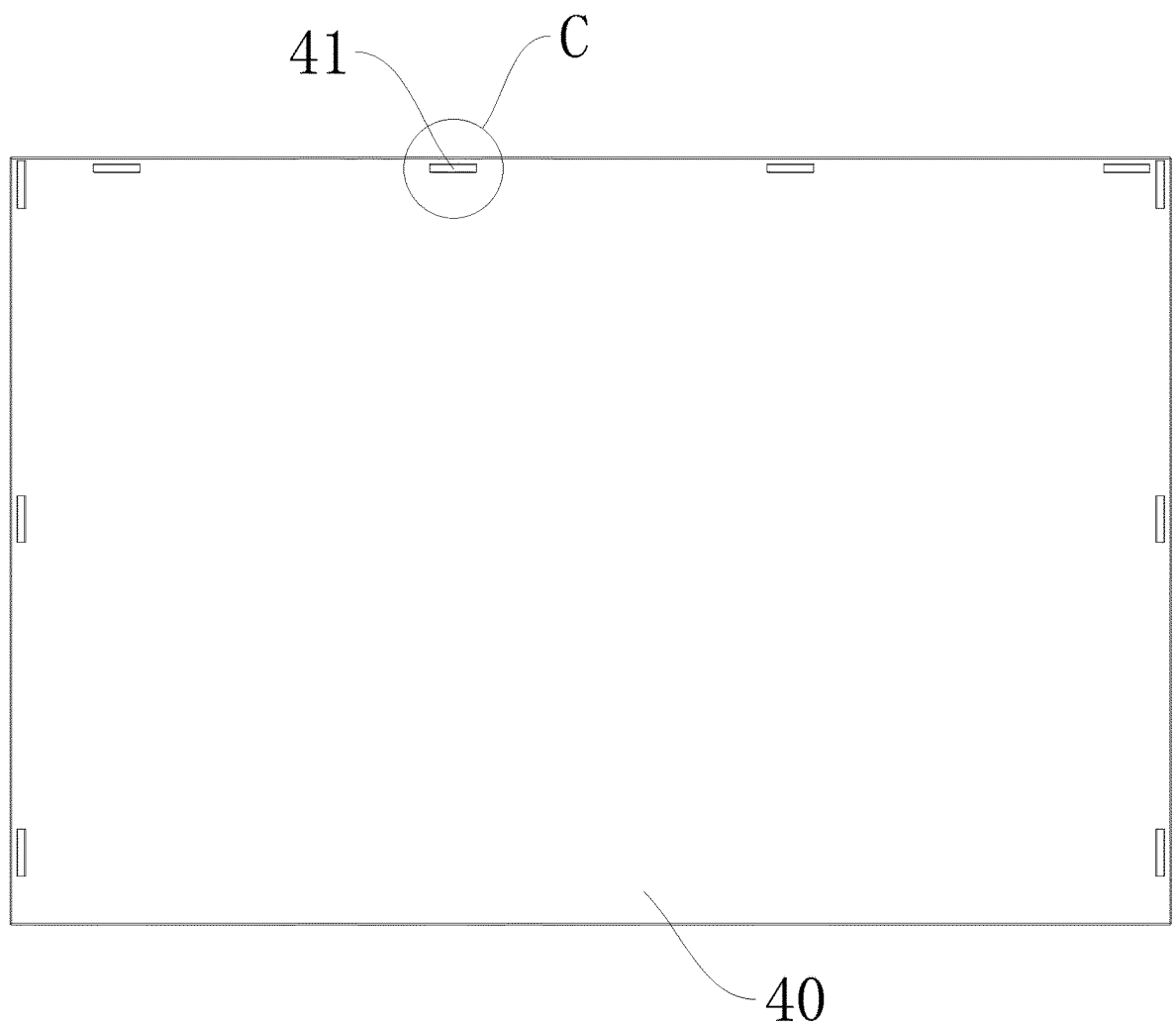
FIG. 10 is a schematic structural view of a bottom plate.
Figure 11:
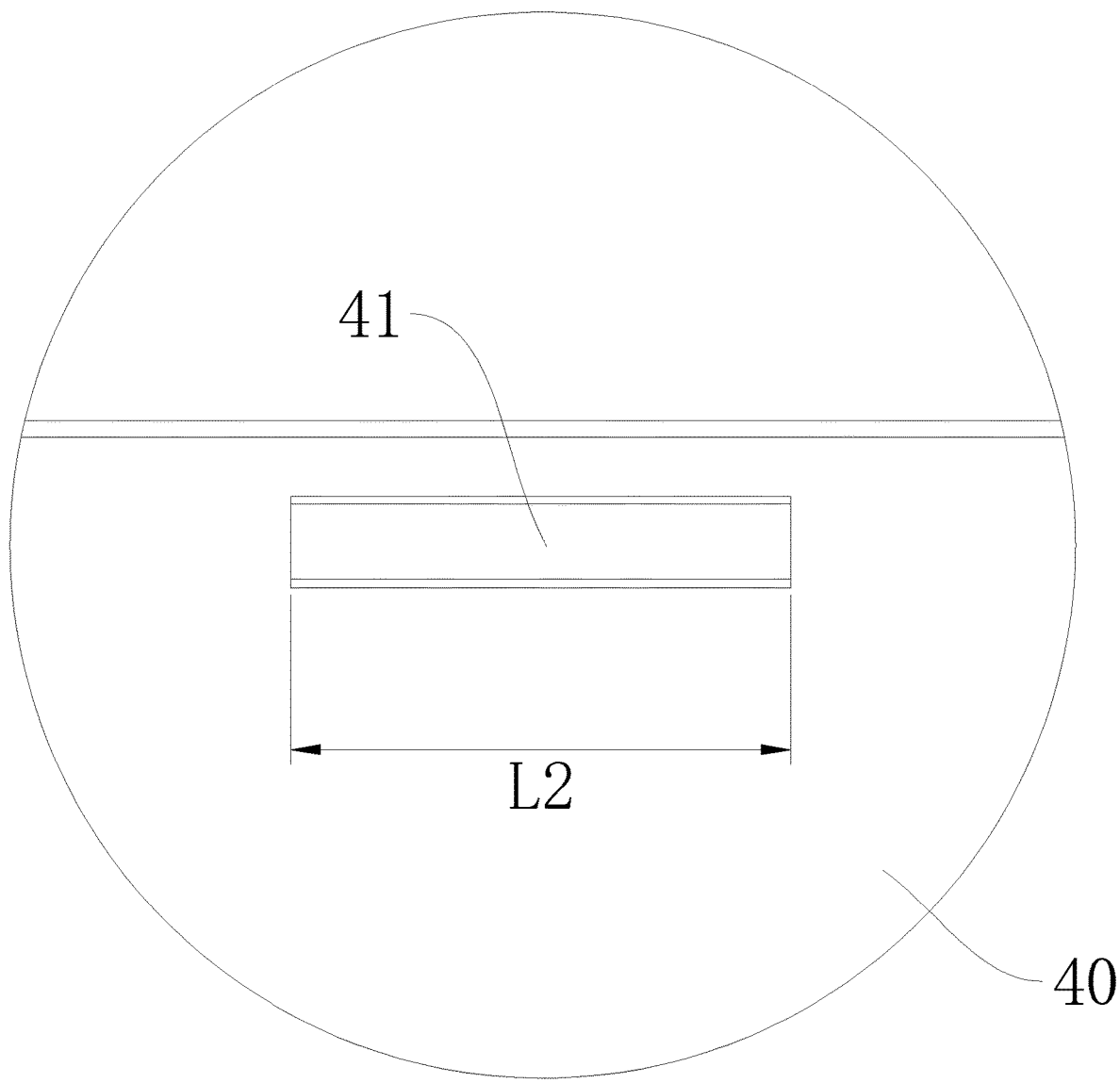
FIG. 11 is an enlarged view of portion C in FIG. 10.
Figure 12:
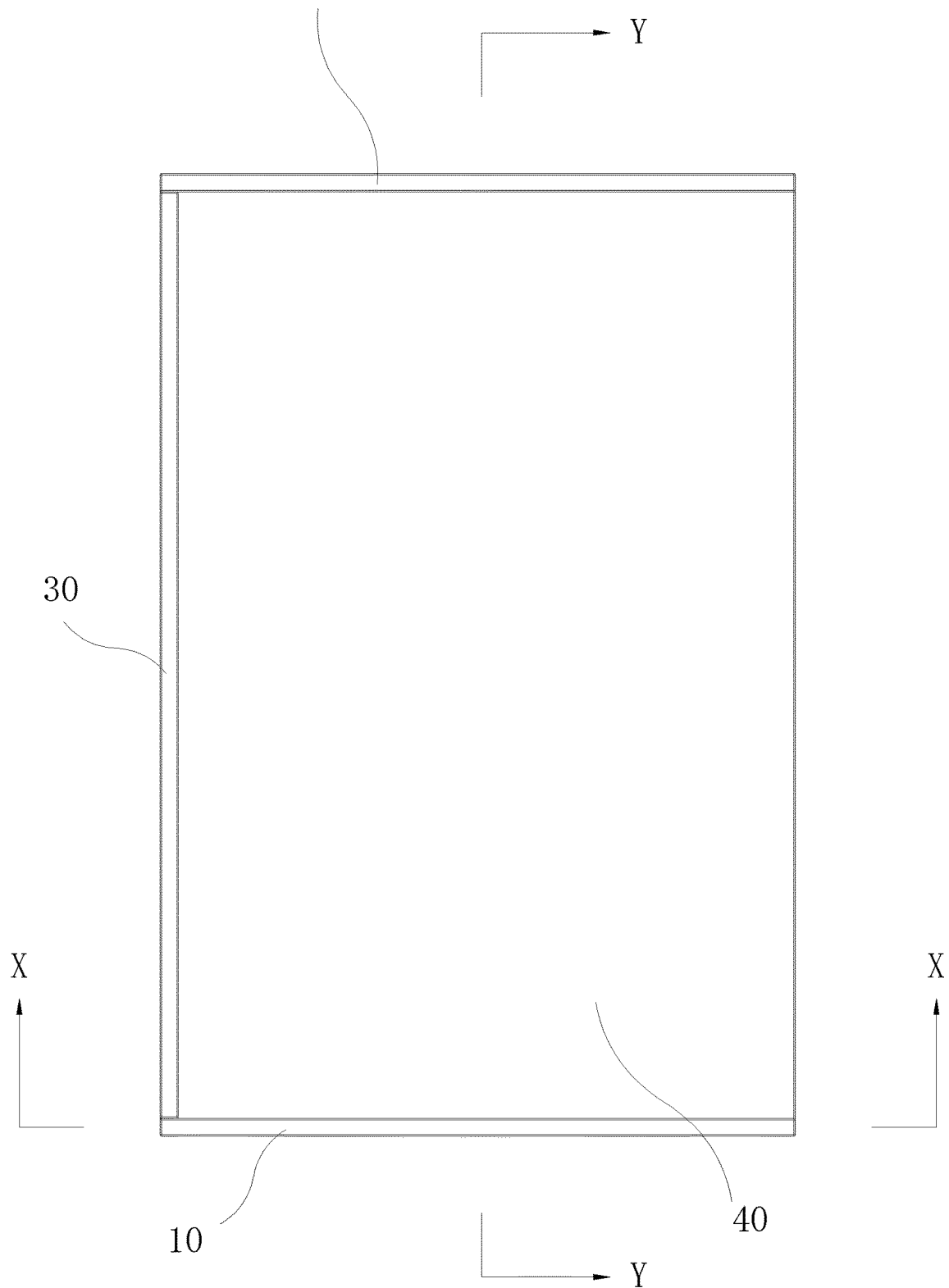
FIG. 12 is a top plan view of the assembled drawer of the present invention.
Figure 13:
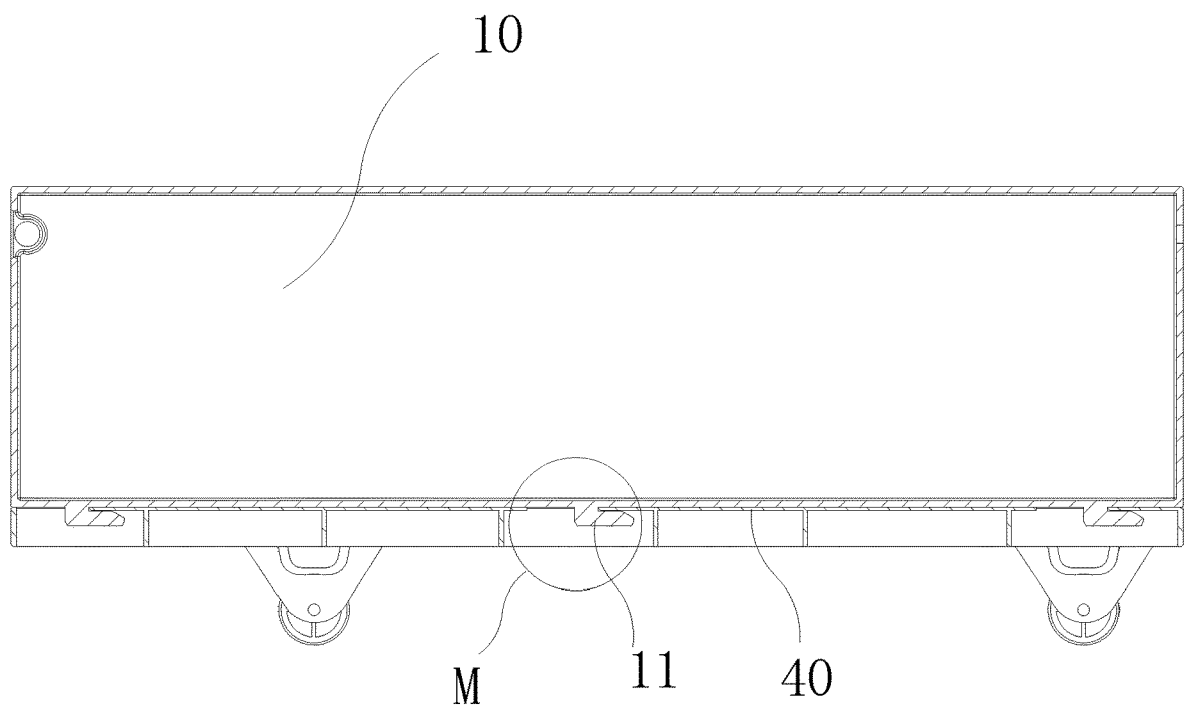
FIG. 13 is a sectional view along X-X in FIG. 12.
Figure 14:
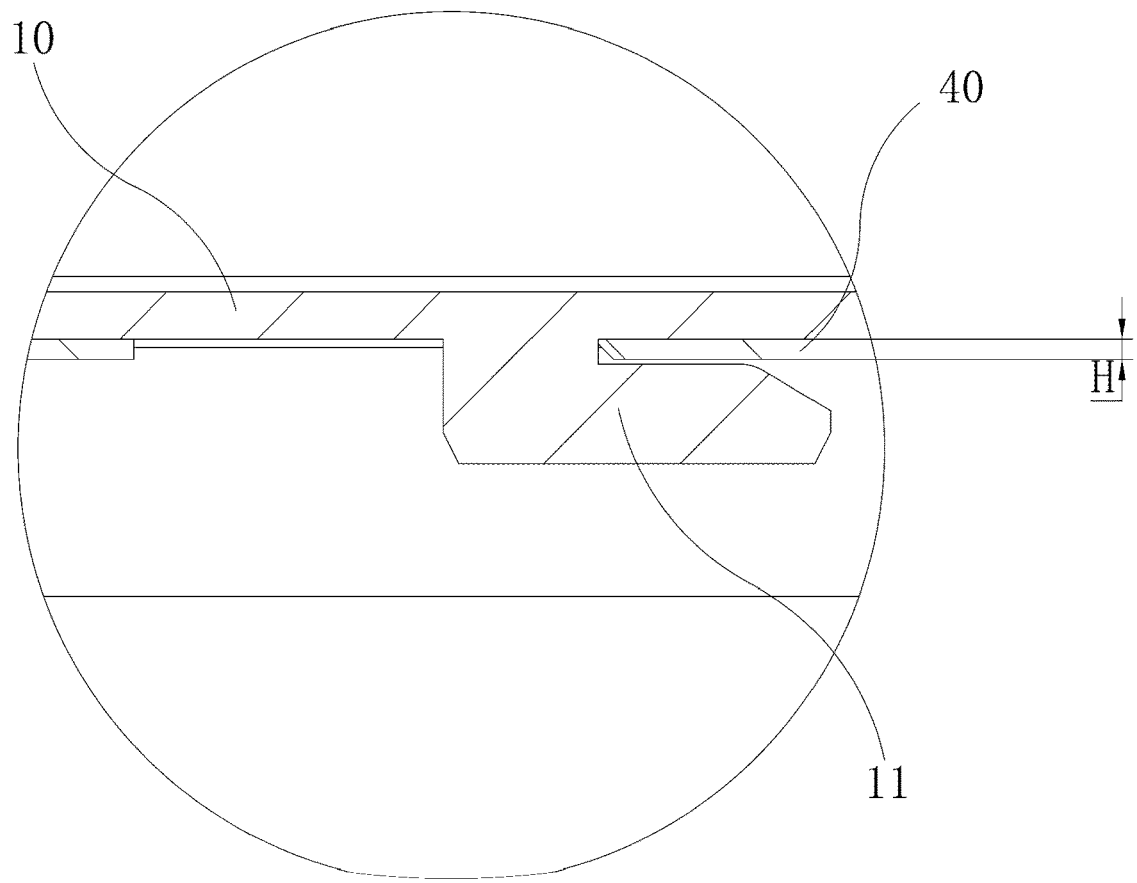
FIG. 14 is the enlarged view of portion M in FIG. 13.
Figure 15:
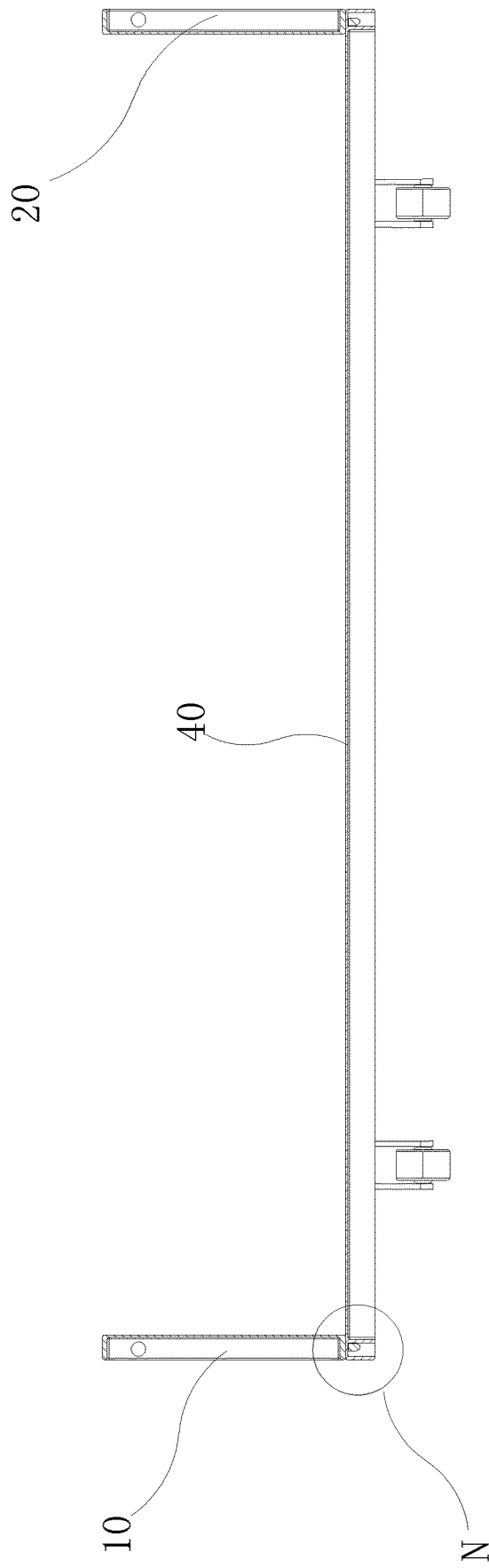
FIG. 15 is a sectional view along Y-Y in FIG. 12.
Figure 16:
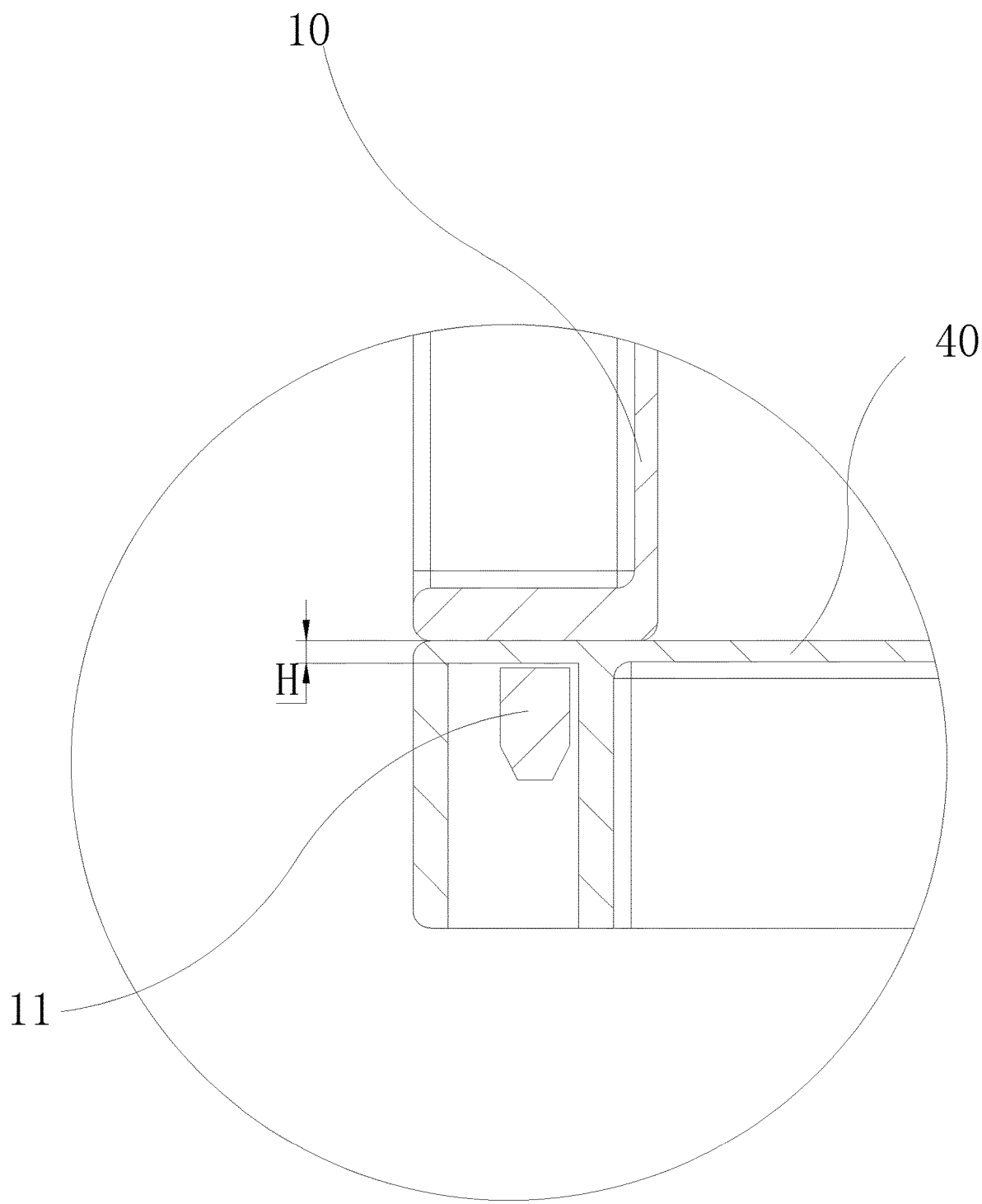
FIG. 16 is the enlarged view of portion N in FIG. 15.

As shown in FIG. 5, in actual use, the assembled drawer is used in combination with a drawer front panel 50, and the drawer front panel 50 is mounted to a front side edge of the bottom plate 40 and is fixedly connected to the bottom plate 40 and the two side plates. In this embodiment, the drawer front panel 50 is fixedly connected to the bottom plate 40 and the two side plates by fasteners; specifically, three fasteners are used at a left side, a right side and a bottom side of a rear surface of the drawer front panel 50 so as to fix the drawer front panel 50 to the first side plate 10, the second side plate 20 and the bottom plate 40 respectively.

According to the present invention, the two side plates and the rear plate 30 are preliminarily fixed to the bottom plate 40 by engagement of the fastening blocks into the fastening grooves 41, then the rear plate 30 is fixed to the first side plate 10 by using one fastener 70, and the rear plate 30 is fixed to the second side plate 20 by using another fastener 70, thereby achieving the assembly of the side plates, the rear plate 30 and the bottom plate 40. During assembly, engagement of the fastening blocks into the fastening grooves 41 on one hand reduces a number of fasteners 70 being used, and on the other hand achieves preliminary fixation between the two side plates, the rear plate 30, and the bottom plate 40. This preliminary fixation will also align the two side plates with the rear plate 30 so that users can conveniently fix the two sides plates with the rear plate 30 by using the fasteners 70. Therefore, the assembled drawer of the present invention is simple in structure, and the two side plates, the rear plate 30, and the bottom plate 40 can be fixed by using only two fasteners 70. Accordingly, assembly and disassembly are convenient, and problems like accessories getting lost will not easily happen.

In this embodiment, a specific implementation of said engagement of the fastening blocks into the fastening grooves 41 for connection between the bottom plate 40, the two side plates, and the rear plate 30 is detailed as follows: The fastening grooves 41 are formed on a left side, a right side, and a rear side of an upper surface of the bottom plate 40, and the fastening grooves 41 penetrate the upper surface of the bottom plate through a bottom surface of the bottom plate 40. Bottom edges of the rear plate 30 and the two side plates are provided with the fastening blocks which can be engaged into the fastening grooves 41. The fastening blocks comprise first fastening blocks 11 on the first side plate 10, second fastening blocks 21 on the second side plate 20, and third fastening blocks 31 on the rear plate 30. During assembly, the first fastening blocks 11 are engaged with the fastening grooves 41 formed on the left side of the upper surface of the bottom plate 40, so as to realize connection between the first side plate 10 and the bottom plate 40. The second fastening blocks 21 are engaged with the fastening grooves 41 formed on the right side of the upper surface of the bottom plate 40, so as to realize connection between the second side plate 20 and the bottom plate 40. The third fastening blocks 31 are engaged with the fastening grooves 41 formed on the rear side of the upper surface of the bottom plate 40, so as to realize connection between the rear plate 30 and the bottom plate 40. Then, the first side plate 10, the second side plate 20 and the rear plate 30 are fixed by the fasteners 70. Accordingly, assembly of the first side plate 10, the second side plate 20, the rear plate 30 and the bottom plate 40 is completed.

Of course, positions of the fastening grooves 41 and the fastening blocks shall not be limited as described above. In the actual use, the fastening grooves 41 may be provided on the two side plates and the rear plate 30, while the fastening blocks may be provided on the bottom plate 40.

In order to increase the connection stability between the side plates, the rear plate 30 and the bottom plate 40, the fastening blocks according to this embodiment are specifically designed so that the fastening blocks can also clamp the bottom plate 40 when the fastening blocks are engaged with the fastening grooves 41. Since the first fastening blocks 11, the second fastening blocks 21, and the third fastening blocks 31 are structurally identical, a specific structural design of the fastening blocks as will be described below is applicable to all the first fastening blocks 11, the second fastening blocks 21, and the third fastening blocks 31, although FIGS. 6-11 illustrate only the first fastening blocks 11 as an example. Therefore, with reference to FIGS. 6-16, each of the fastening blocks is provided with a connection part 111 and a clamping part 112; one end of the connection part 111 is connected to a corresponding one of the rear plate 30 and the two side plates, and another end of the connection part 111 is connected to the clamping part 112, and the clamping part 112 is parallel to the bottom edge of the corresponding one of the rear plate 30 and the two side plates; a clamping slit 113 is formed between the clamping part 112 and the corresponding one of the rear plate 30 and the two side plates, and the bottom plate 40 is clamped by the clamping slit 113. With reference to a particular example when, for example, the front side plate 10 is connected to the bottom plate 40, the first fastening blocks 11 of the first side plate 10 are engaged into the corresponding fastening grooves 41, and then slide the first side plate 10 so that the bottom plate 40 is clamped into the clamping slits 113 of the first fastening blocks 11, thereby achieving clamping connection between the first side plate 10 and the bottom plate 40. Also, one end of the clamping part 112 away from the connection part 111 is shaped as an inclined guide surface 114, and the inclined guide surface 114 is disposed adjacent to an insertion opening of the clamping slit 113 from which the bottom plate 40 is inserted into the clamping slit 113 and clamped therein.

In the present embodiment, a height K of the clamping slit 113 is greater than or equal to a thickness H of the bottom plate 40 (the thickness H of the bottom plate 40 refers to a thickness of an upper surface portion of the bottom plate 40, excluding a thickness constituted by side portions of the bottom plate 40). In actual use, when the height K of the clamping slit 113 is slightly larger than the thickness of the bottom plate 40, the bottom plate 40 can be tightly fitted with the clamping slit 113, and the clamping stability of the corresponding fastening groove 41 and the corresponding fastening block is optimal. A length L2 of each of the fastening grooves 41 is greater than or equal to a length L1 of a corresponding clamping part 112. Each of the fastening blocks is further provided with a guide part 115, and the guide part 115 is connected to a bottom side of the clamping part 112; a length L3 of the guide part 115 is smaller than the length L1 of the corresponding clamping part 112; a height of the guide part 115 is smaller than a height of the clamping part 112. The guide part 115 is provided to facilitate quick positioning of the corresponding fastening block 11 into the corresponding fastening groove 41.

In this embodiment, an upper portion of the first side plate 10 is provided with a first fixing hole 12, an upper portion of the second side plate 20 is provided with a second fixing hole 22, the left side edge of the rear plate 30 is provided with a third fixing hole 32, and the right side edge of the rear plate 30 is provided with a fourth fixing hole 33. When the first side plate 10, the second side plate 20 and the rear plate 30 are connected to the bottom plate 40, the first fixing hole 12 and the third fixing hole 32 are aligned, the second fixing hole 22 and the fourth fixing hole 33 are aligned. Therefore, the user directly inserts two fasteners 70 to penetrate through the corresponding fixing holes to achieve locking.

Figure 17:
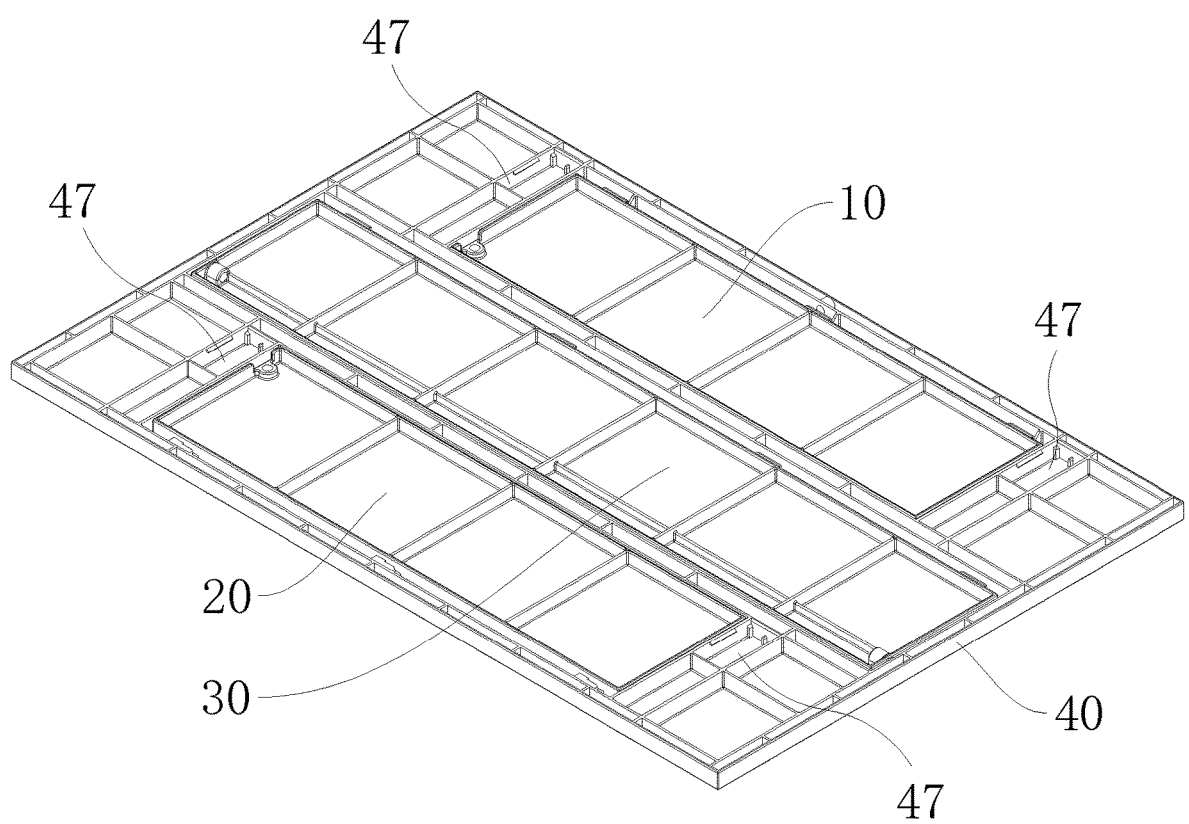
FIG. 17 is a schematic diagram of storage of the assembled drawer of the present invention in a disassembled state.
Figure 18:
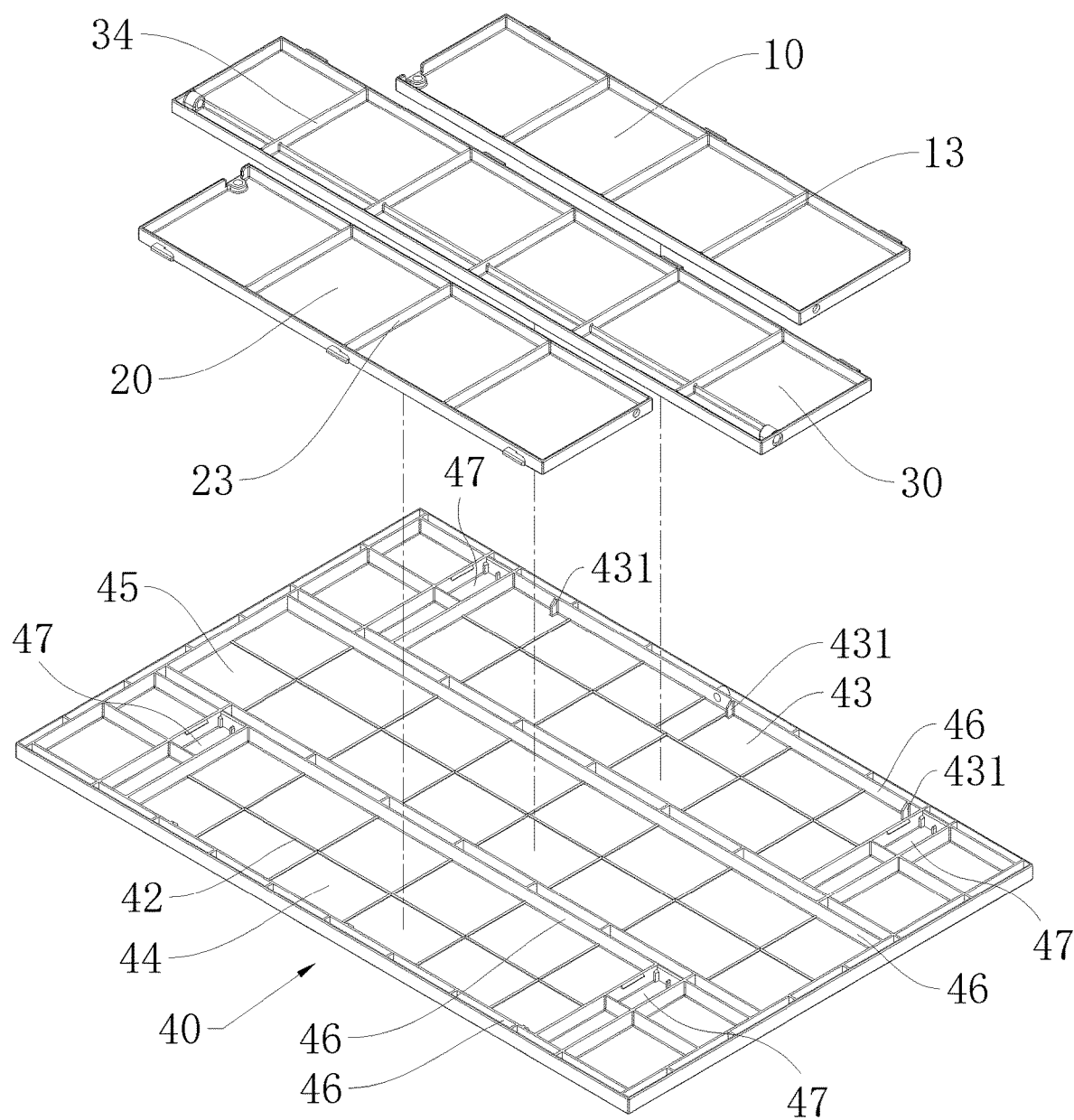
FIG. 18 is an exploded view of FIG. 17.
Figure 19:
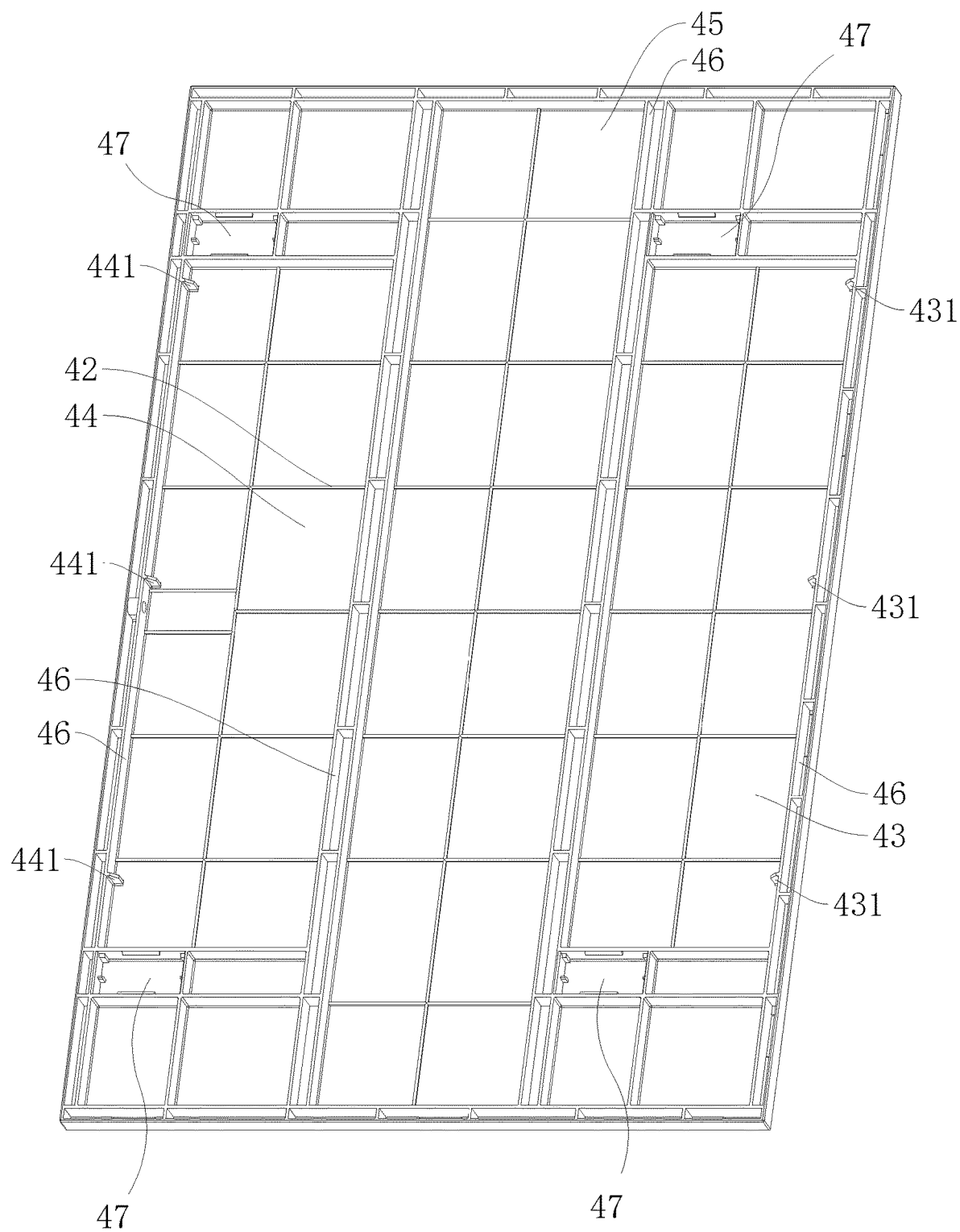
FIG. 19 is a bottom perspective view of a bottom plate.
Figure 20:
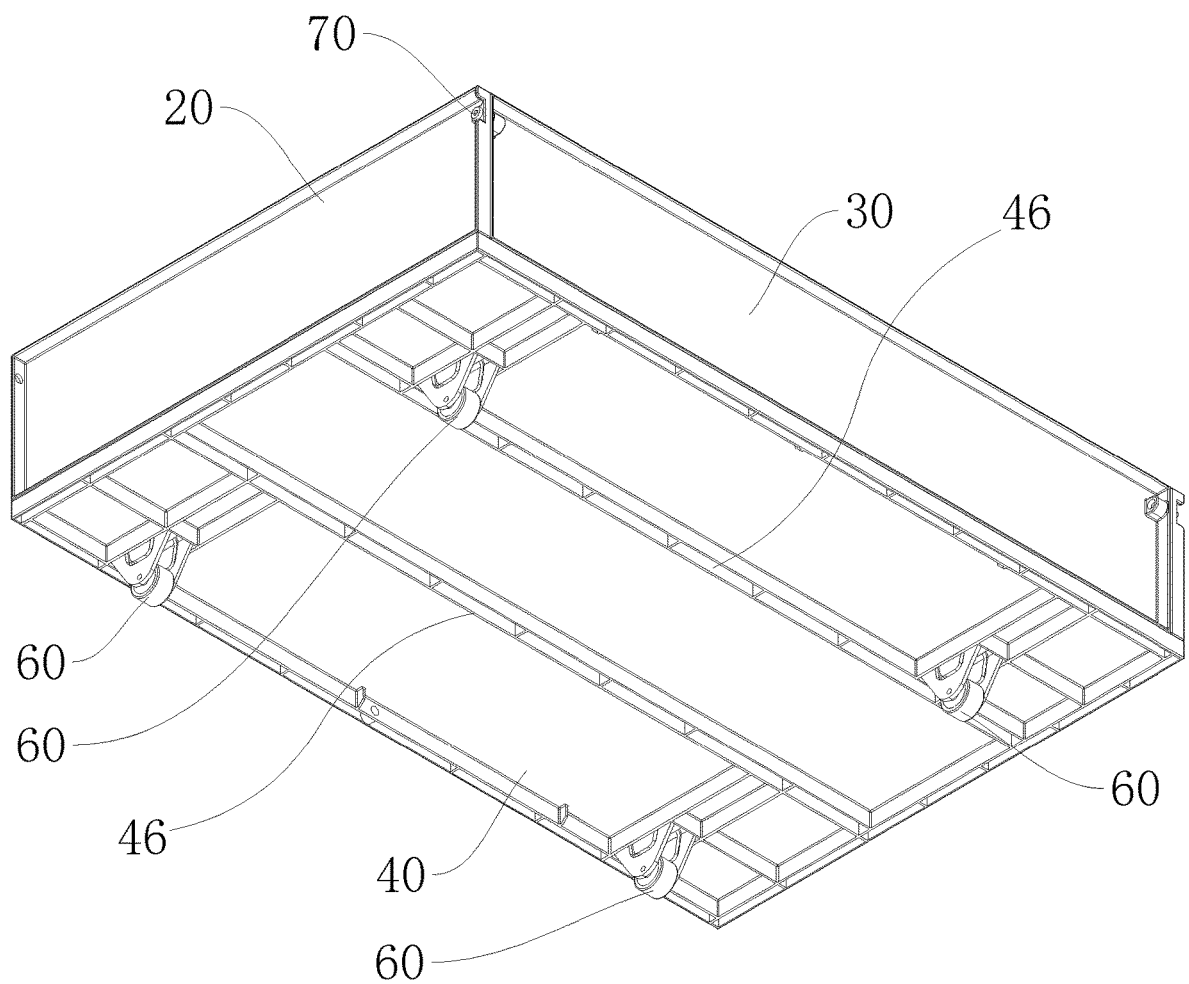
FIG. 20 is a schematic structural view of another embodiment of the drawer of the present invention.
Figure 21:
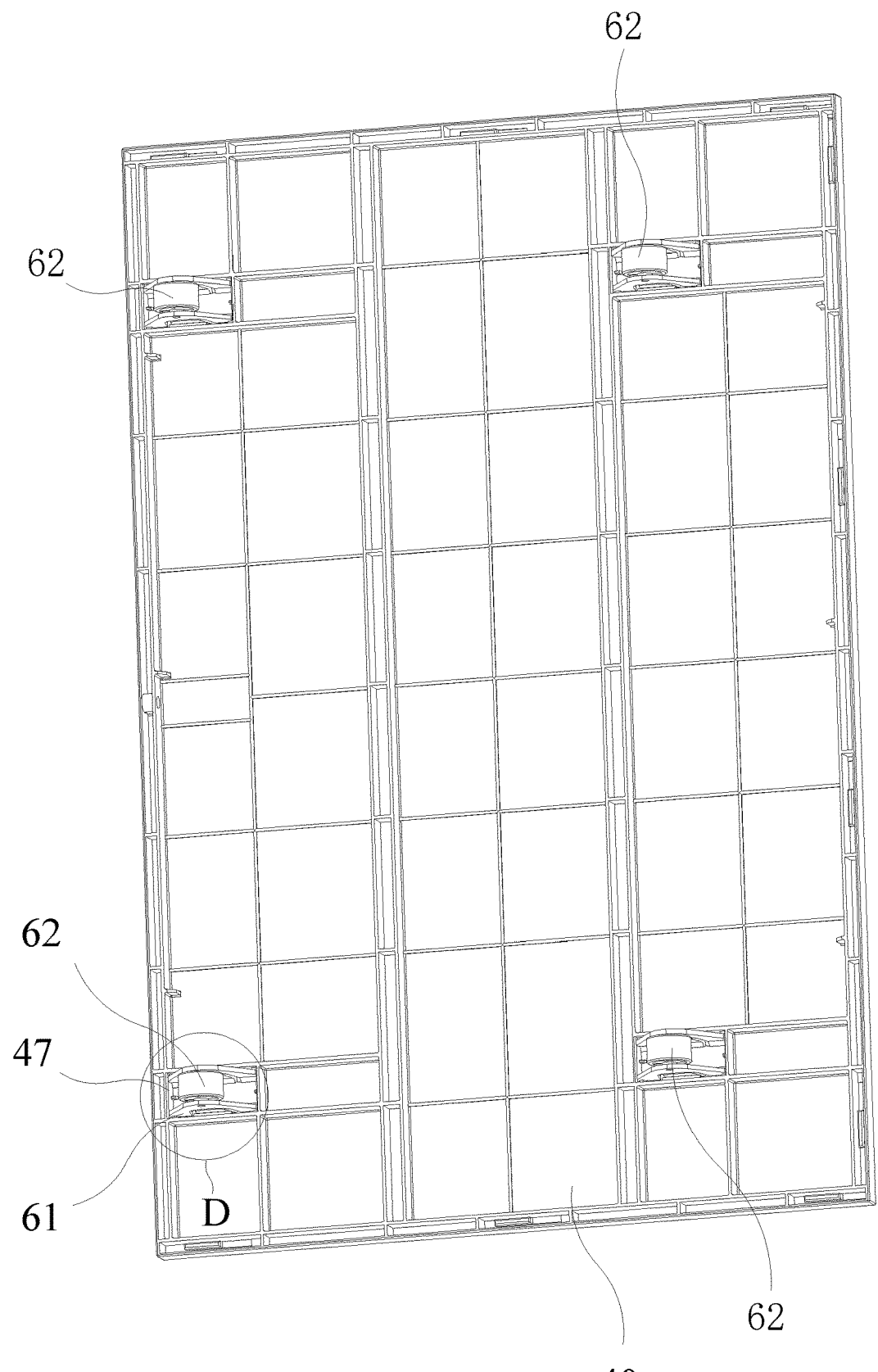
FIG. 21 is a schematic view of a bottom plate and casters.
Figure 22:
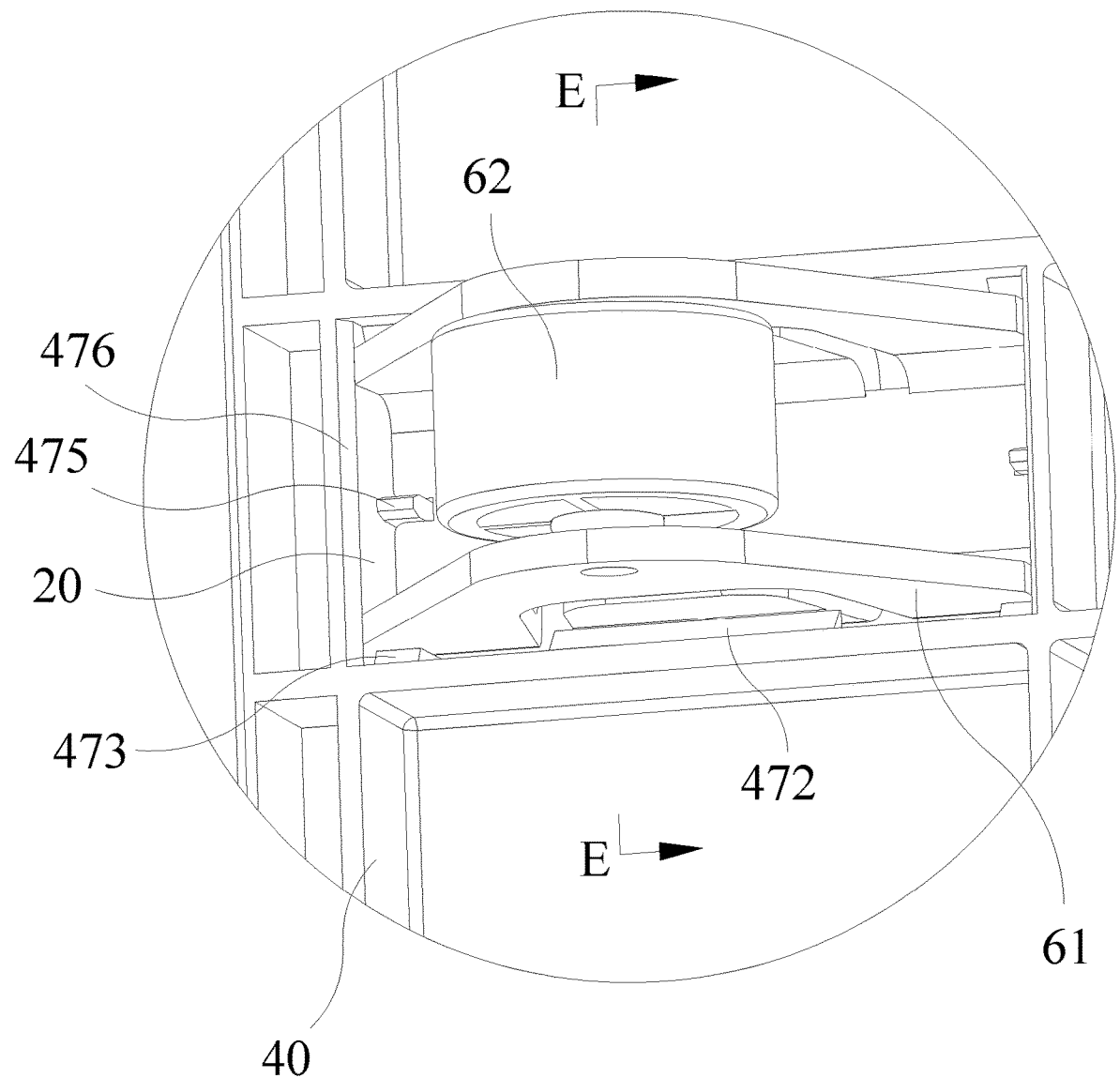
FIG. 22 is an enlarged view of portion D in FIG. 21.
Figure 23:
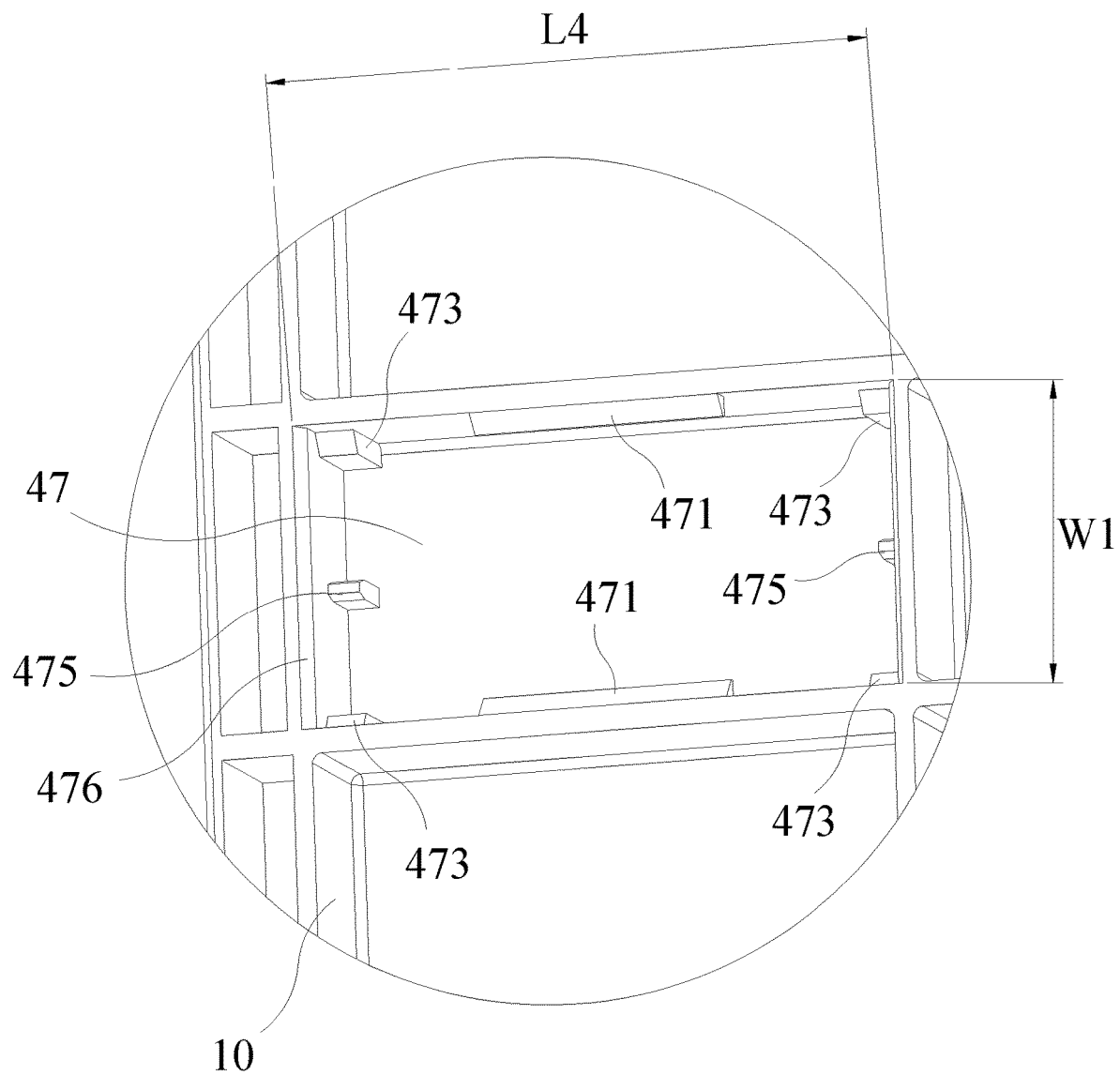
FIG. 23 is a schematic diagram of FIG. 22 with the caster omitted.
Figure 24:
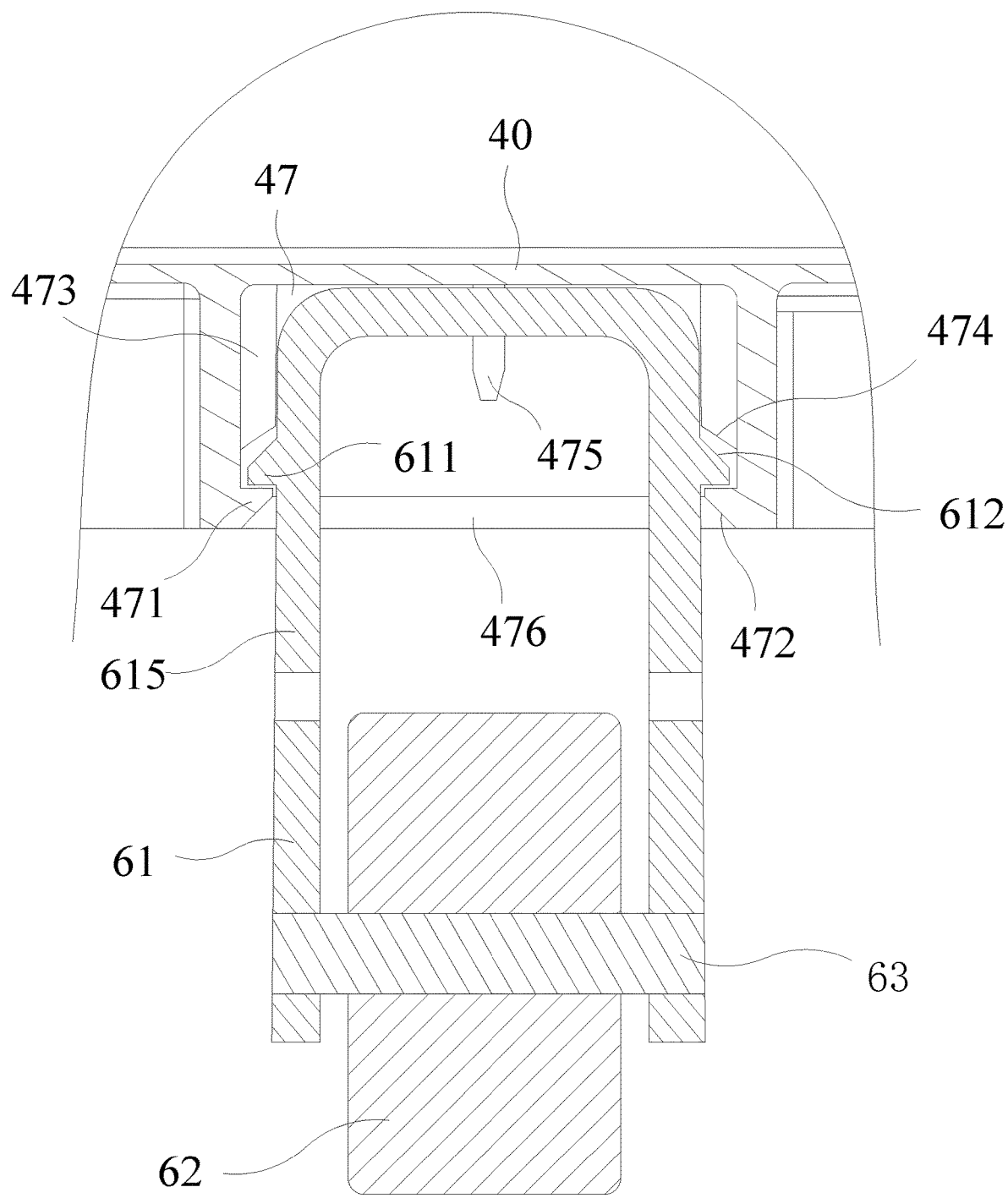
FIG. 24 is a cross-sectional view taken in a direction E in FIG. 22.
Figure 25:
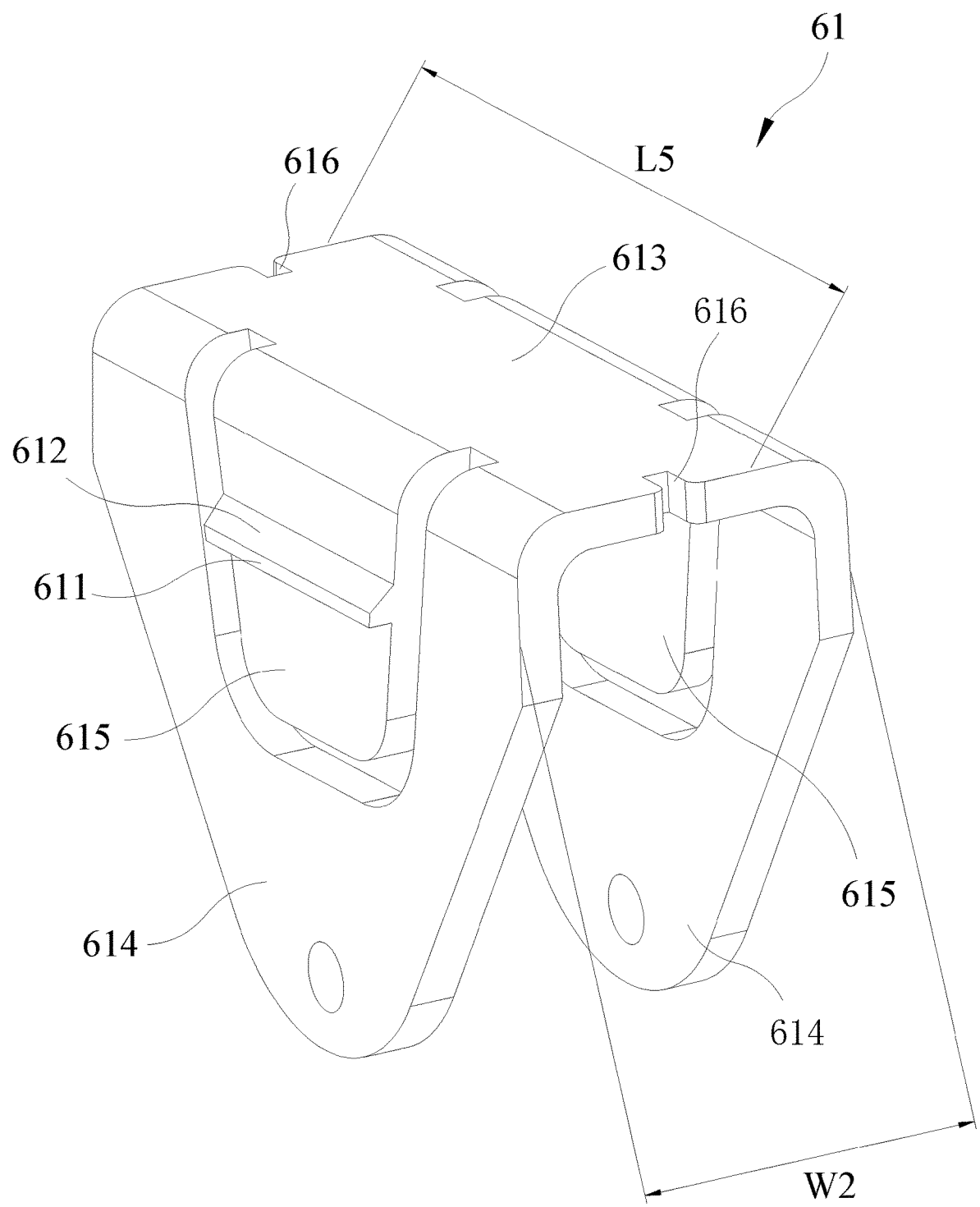
FIG. 25 is a schematic diagram of a support frame.

As shown in FIGS. 17-19, in order to improve the structural strength of the drawer, an outer side surface of the rear plate 30, outer side surfaces of the first side plate 10 and the second side plate 20, and the bottom surface of the bottom plate 40 are all provided with reinforcing ribs. The reinforcing ribs comprises first reinforcing ribs 13 on the first side plate 10, second reinforcing ribs 23 on the second side plate 20, third reinforcing ribs 34 on the rear plate 30, and fourth reinforcing ribs 42 on the bottom plate 40. As shown in FIG. 20, it is of course possible not to provide any reinforcing ribs on the rear plate 30, the first side plate 10, the second side plate 20 and the bottom plate 40.

The bottom surface of the bottom plate 40 is provided with retaining walls 46, and the retaining walls 46 enclose the bottom surface of the bottom plate 40 and divide the bottom surface of the bottom plate 40 into at least three storage areas. The rear plate 30, the first side plate 10, and the second side plate 20 are accommodated in the three storage areas respectively when the assembled drawer is in a disassembled state. The three storage areas comprise a first storage area 43, a second storage area 44, and a third storage area 45. In the disassembly state of the assembled drawer, the first side plate 10 is stored in the first storage area 43, the second side plate 20 is stored in the second storage area 44, and the rear plate 30 is stored in the third storage area 45. Therefore, the drawer can be conveniently transported and stored.

The assembled drawer must have one first side plate 10 and one second side plate 20; the first side plate 10 and the second side plate 20 are generally the same in size. Therefore, when the drawer is packed and transported, two first side plates 10 or two second side plates 20 may be stored accidentally in the first storage area 43 and the second storage area 44 during packing, resulting in failure to install and use the drawer when the package is delivered to the user. Therefore, in order to ensure that the assembled drawer contains one first side plate 10 and one second side plate 20 during packing, the present invention provides fool-proof blocks in the first storage area 43 and the second storage area 44. Specifically, first fool-proof blocks 431 corresponding to the first fastening blocks 11 of the first side plate 10 respectively are arranged in the first storage area 43, and second fool-proof blocks 441 corresponding to the second fastening blocks 21 of the second side plate 20 respectively are arranged in the second storage area 44. Oppositely facing side edges of the first storage area 43 and the second storage area 44 closest to each other are defined as first side edges of the first storage area 43 and the second storage area 44, and oppositely facing side edges farthest away from each other are defined as second side edges of the first storage area 43 and the second storage area 44; the first fool-proof blocks 431 are disposed at the first side edge of the first storage area 43, while the second fool-proof blocks 441 are disposed at the first side edge of the second storage area 44; alternatively, the first fool-proof blocks 431 are disposed at the second side edge of the first storage area 43, while the second fool-proof blocks 441 are disposed at the second side edge of the second storage area 44.

In order to facilitate the use of the drawer, casters 60 are mounted on the bottom surface of the bottom plate 40. A quantity of the casters 60 is four in this embodiment, the casters 60 allow the drawer to be slidable, thus it can be conveniently pulled out from the bottom of a bed or a sofa.

In the present embodiment, as shown in FIGS. 21-25, each caster 60 comprises a support frame 61 and a wheel 62, and the wheel 62 is rotatably connected to a lower part of the support frame 61 through a pivot shaft 63. The bottom surface of the bottom plate 40 is also provided with mounting grooves 47 corresponding to the casters 60 respectively; an upper end of each support frame 61 is inserted into a corresponding mounting groove 47, and the mounting groove 47 limits the support frames 61 from moving horizontally. Further, at least one first limiting member 611 is arranged on each support frame 61, at least one second limiting member 471 corresponding to said at least one first limiting member 611 is arranged on at least one groove wall of the corresponding mounting groove 47, and said at least one first limiting member 611 and said at least one second limiting member 471 are fastened to each other to limit the support frame 61 from being separated from the corresponding mounting groove 47. As a preferred implementation, said at least one first limiting member comprises two first limiting members 611, and the two first limiting members 611 are located on two opposite side surfaces of each support frame 61 respectively. Correspondingly, said at least one limiting member comprises two second limiting members 471, and the second limiting members 471 are arranged on opposite groove walls of the corresponding mounting groove 47 respectively. Said at least one first limiting member 611 and said at least one second limiting member 471 are both ribs, a first guide slope 612 is provided on each first limiting member 611, and a second guide slope 472 is provided on each second limiting member 471. When the support frame 61 is inserted into the corresponding mounting grooves 47, the first guide slope 612 and the second guide slope 472 guide the insertion so that the first limiting member 611 and the corresponding second limiting member 471 can be fastened with each other. With this arrangement, it is ensured that the support frames 61 are reliably fixed and limited.

Each support frame 61 comprises a connection plate 613 and two side panels 614, the connection plate 613 and the two side panels 614 are formed integrally as one piece; the two side panels 614 are connected to two sides of the connection plate 613 respectively. Also, the two side panels 614 are parallel to each other; and a corresponding second limiting member 471 faces towards an outer side surface of each side panel 614. The support frame 61 having the structures as described can facilitate the installation of the wheel 62. Further, when the caster 60 needs to be detached from the bottom surface of the drawer, the two side panels 614 are pressed towards each other, so that the first limiting members 611 and the corresponding second limiting members 471 are disengaged from each other more easily, and hence facilitating disassembly. In order to further facilitate the disassembly of the caster 60 and avoid the first limiting members 611 and the second limiting members 471 from being accidentally disengaged from each other, each first limiting member 611 of the support frame 61 is arranged on an elastic sheet 615, the elastic sheet 615 is formed by partially hollowing out a corresponding side panel 614; an upper end of the elastic sheet 615 is positioned as close to the connection plate 613 as possible, a lower end of the elastic sheet 615 extends out of the mounting groove 47, so that user can press the elastic sheet 615 conveniently. When the elastic sheet 615 is pressed, the first limiting member 611 on the elastic sheet 615 can be separated from a corresponding second limiting member 471.

In order to enable the support frame 61 to be more smoothly matched with the corresponding mounting groove 47, in this embodiment, a width W1 of the mounting groove 47 is greater than a width W2 of the support frame 61, and said at least one second limiting member 471 is arranged on a corresponding groove wall which corresponds to a lengthwise direction of the mounting groove 47 (i.e., the groove wall perpendicular to the width direction of the mounting groove 47). Additionally, at least two positioning ribs 473 are further arranged on the corresponding groove wall, and said at least two positioning ribs 473 are positioned on two sides of the corresponding second limiting member 471 respectively. Said at least two positioning ribs 473 are flush with the corresponding second limiting member 471 (in terms of the depths which they extend into the mounting groove along the widthwise direction of the mounting groove), and said at least two positioning ribs 473 abut against a corresponding side panel 614 of the support frame 61. In order to facilitate the insertion of the support frame 61, a first inclined slope 474 is arranged on each positioning rib 473 at an end of the positioning rib 473 facing towards an opening of the mounting groove 47 to guide the support frame 61. A length L4 of the mounting groove 47 is substantially the same as a length L5 of the support frame 61, two groove walls along the widthwise direction of the mounting groove 47 (i.e. the groove walls perpendicular to the lengthwise direction of the mounting groove 47) are each provided with a positioning strip 475 to position the support frame 61, and the support frame 61 is provided with positioning insertion grooves 616 each corresponding to a corresponding positioning strip 475. In addition, second inclined slopes 476 that guide the support frame 61 are arranged on the two groove walls along the widthwise direction of the mounting groove 47 respectively.

In summary, the two side plates, the rear plate 30, and the bottom plate 40 are assembled through engagement of fastening blocks into the fastening grooves 41 in combination with the use of fasteners 70. Engagement of the fastening blocks into the fastening grooves 41 on one hand reduces the number of fasteners 70 being used, and on the other hand achieves preliminary fixation between the two side plates, the rear plate 30, and the bottom plate 40. This preliminary fixation will also align the two side plates with the rear plate 30 so that users can conveniently fix the two sides plates with the rear plate 30 by using the fasteners 70. In addition, the casters 60 are mounted at the bottom surface of the bottom plate 40 by insertion where fasteners are not required, and each caster 60 can be dismounted simply by pressing the corresponding support frame 61 to slightly deform the support frame, so that each first limiting member 611 and the corresponding second limiting member 471 are disengaged from each other, thereby achieving easier and faster assembly and disassembly of the caster 60. The assembled drawer of the present invention is simple in structure, the two side plates, the rear plate, and the bottom plate can be fixed simply by using two fasteners 70. The user can conveniently assemble and disassemble the assembled drawer, and problems like accessories getting lost will not easily happen.

What is claimed is:

1. An assembled drawer, comprising a bottom plate, a rear plate, and two side plates; the rear plate and the two side plates are detachably installed on the bottom plate;

the rear plate is connected to a rear side of the bottom plate, and the two side plates are connected to a left side and a right side of the bottom plate respectively, and the rear plate and the two side plates are connected to the bottom plate by engagement of fastening blocks into fastening grooves; the two side plates are fixed to a left side edge and a right side edge of the rear plate respectively through fasteners, and the rear plate and the two side plates are erected on the bottom plate to define a storage space on the bottom plate;

the fastening grooves are formed on a left side, a right side, and a rear side of an upper surface of the bottom plate, and the fastening grooves penetrate the upper surface of the bottom plate through a bottom surface of the bottom plate;

bottom edges of the rear plate and the two side plates are provided with the fastening blocks engageable with the fastening grooves;

the bottom surface of the bottom plate is provided with retaining walls, and the retaining walls enclose the bottom surface of the bottom plate and divide the bottom surface of the bottom plate into at least three storage areas; the rear plate and the two side plates are accommodated in the three storage areas respectively when the assembled drawer is in a disassembled state.

2. The assembled drawer of claim 1, wherein each of the fastening blocks is provided with a connection part and a clamping part; one end of the connection part is connected to a corresponding one of the rear plate and the two side plates, and another end of the connection part is connected to the clamping part, and the clamping part is parallel to a bottom edge of the corresponding one of the rear plate and the two side plates; a clamping slit is formed between the clamping part and the corresponding one of the rear plate and the two side plates, and the clamping slit is configured to clamp the bottom plate.

3. The assembled drawer of claim 1, wherein two of the three storage areas for storing the two side plates are defined as a first storage area and a second storage area respectively; first fool-proof blocks corresponding to the fastening blocks of one of the two side plates respectively are arranged in the first storage area, and second fool-proof blocks corresponding to the fastening blocks of another one of the two side plates respectively are arranged in the second storage area; oppositely facing side edges of the first storage area and the second storage area closest to each other are defined as first side edges of the first storage area and the second storage area, and oppositely facing side edges of the first storage area and the second storage area farthest away from each other are defined as second side edges of the first storage area and the second storage area; the first fool-proof blocks are disposed at the second side edge of the first storage area, while the second fool-proof blocks are disposed at the second side edge of the second storage area.

4. The assembled drawer of claim 1, further comprising at least two casters; the casters are detachably mounted on a bottom surface of the bottom plate; each caster comprises a support frame and a wheel; the bottom surface of the bottom plate is also provided with mounting grooves corresponding to the casters respectively; an upper end of each support frame is inserted into a corresponding mounting groove, and the mounting groove limits the support frame from moving horizontally; at least one first limiting member is arranged on each support frame; at least one second limiting member corresponding to said at least one first limiting member is arranged on at least one groove wall of the corresponding mounting groove, and said at least one first limiting member and said at least one second limiting member are fastened to each other to limit the support frame from being separated from the corresponding mounting groove; the wheel is rotatably connected to a lower part of the support frame.

5. The assembled drawer of claim 4, wherein each first limiting member of each support frame is arranged on an elastic sheet; the elastic sheet is formed on the corresponding support frame; a lower end of the elastic sheet extends out of the corresponding mounting groove; when the elastic sheet is pressed, the first limiting member on the elastic sheet is separated from a corresponding second limiting member.

6. The assembled drawer of claim 4, wherein said at least one first limiting member comprises two first limiting members, and the two first limiting members are located on two opposite side surfaces of each support frame respectively.

7. The assembled drawer of claim 6, wherein said at least one first limiting member and said at least one second limiting member are both ribs; guide slopes are provided on the ribs respectively.

8. The assembled drawer of claim 7, wherein a width of each mounting groove is greater than a width of a corresponding support frame, and each of said at least one second limiting member is arranged on a corresponding groove wall which corresponds to a lengthwise direction of the mounting groove; at least two positioning ribs are further arranged on the corresponding groove wall, and said at least two positioning ribs are positioned on two sides of a corresponding second limiting member respectively; said at least two positioning ribs are flush with the corresponding second limiting member.

9. The assembled drawer of claim 7, wherein a length of each mounting groove is the same as a length of a corresponding support frame, two groove walls along a widthwise direction of the mounting groove are each provided with a positioning strip to position the corresponding support frame, and the support frame is provided with positioning insertion grooves each corresponding to a corresponding positioning strip.

* * * * *